(12) United States Patent
Janson

(10) Patent No.: US 12,427,590 B1
(45) Date of Patent: Sep. 30, 2025

(54) BOLT CUTTER WITH TRIPLE COMPOUND LEVERAGE

(71) Applicant: Paul Janson, Porter Ranch, CA (US)

(72) Inventor: Paul Janson, Porter Ranch, CA (US)

( * ) Notice: Subject to any disclaimer, the term of this patent is extended or adjusted under 35 U.S.C. 154(b) by 0 days.

(21) Appl. No.: 19/032,964

(22) Filed: Jan. 21, 2025

Related U.S. Application Data

(60) Provisional application No. 63/624,474, filed on Jan. 24, 2024.

(51) Int. Cl.
*A01G 3/02* (2006.01)
*B23D 29/02* (2006.01)

(52) U.S. Cl.
CPC .................. *B23D 29/023* (2013.01)

(58) Field of Classification Search
CPC ........ A01G 3/0251; A01G 3/02; A01G 3/021; A01G 3/0255; A01G 3/025; Y10T 83/04; B26B 13/06; B26B 17/02; B26B 13/26
USPC ...... 83/13; 30/192, 211, 244, 245, 250, 252, 30/254, 341, 342, 351, 271, 251, 193, 30/198, 249, 259, 188; 81/348, 359, 360, 81/364, 366; 72/409.12, 409.01, 409, 72/18.409, 19; 29/251, 268, 270; D8/8
See application file for complete search history.

(56) References Cited

U.S. PATENT DOCUMENTS

| | | | |
|---|---|---|---|
| 351,339 A | | 10/1886 | Pullman |
| 743,003 A | * | 11/1903 | Lamb ...................... B26B 17/02 30/192 |
| 1,105,191 A | * | 7/1914 | Flora et al. ........... B65B 13/345 30/192 |
| 1,760,627 A | * | 5/1930 | Bernard .................. B26B 17/02 30/271 |
| 3,574,938 A | * | 4/1971 | Porter ................... H01R 43/042 30/193 |
| 6,789,324 B2 | | 9/2004 | Linden |
| 7,444,851 B1 | | 11/2008 | Janson |
| 7,530,172 B1 | * | 5/2009 | Wu ....................... A01G 3/0251 30/244 |
| 2004/0255468 A1 | * | 12/2004 | Chang ..................... B26B 17/02 30/192 |
| 2011/0083327 A1 | * | 4/2011 | Poole ..................... B26B 17/02 30/192 |

* cited by examiner

*Primary Examiner* — Ghassem Alie
(74) *Attorney, Agent, or Firm* — Brian S. Steinberger; Hilary F. Steinberger; Steinberger IP Law

(57) ABSTRACT

Systems, devices, and methods for providing hand tool bolt cutters and methods having triple compound leverage, in order to easily cut through bolts, rebar, steel rods, and cables sized up to, 5/16", 3/8" in diameter, grade 5 and higher with ease, while holding the bolt cutter in both hands at chest level. The triple compound leverage bolt cutter provides at least approximately 50% more leverage over existing single compound bolt cutters.

10 Claims, 19 Drawing Sheets

FIG. 2A
(PRIOR ART)
FIG. 2B
(PRIOR ART)
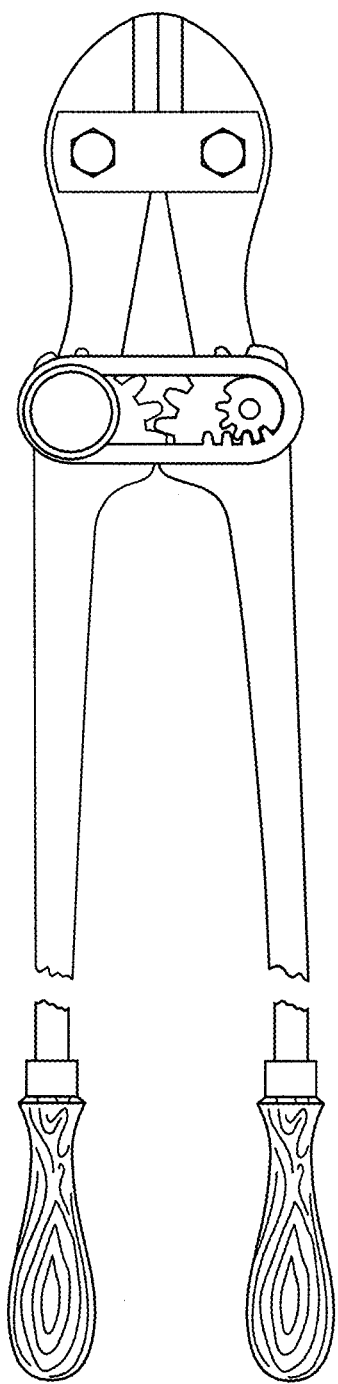
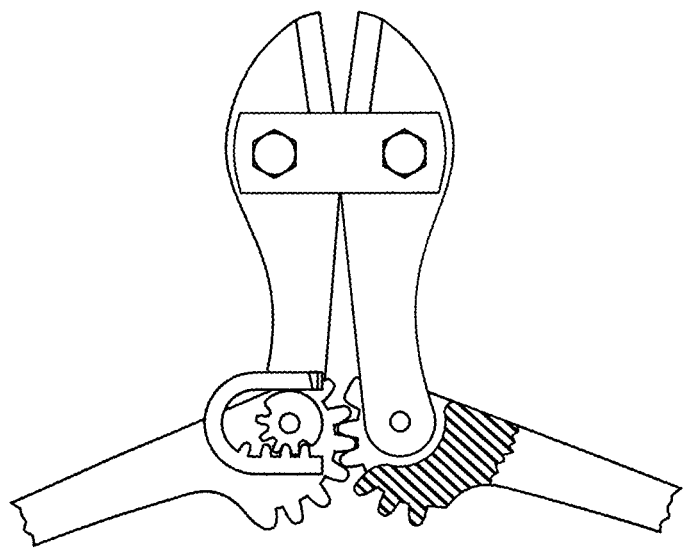
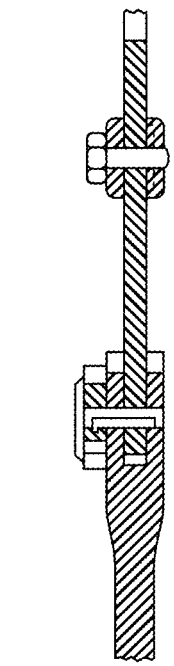
FIG. 2C
(PRIOR ART)

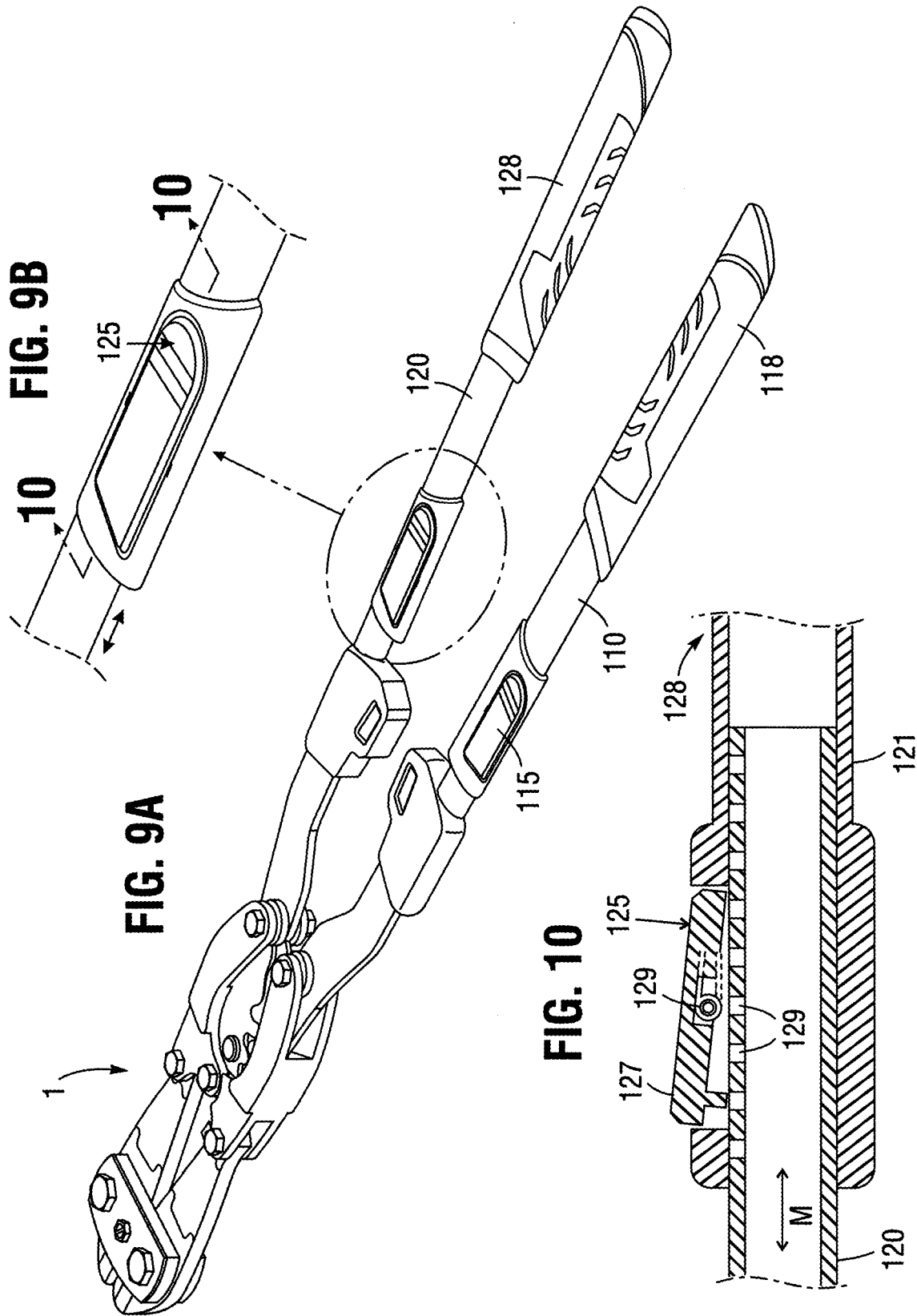

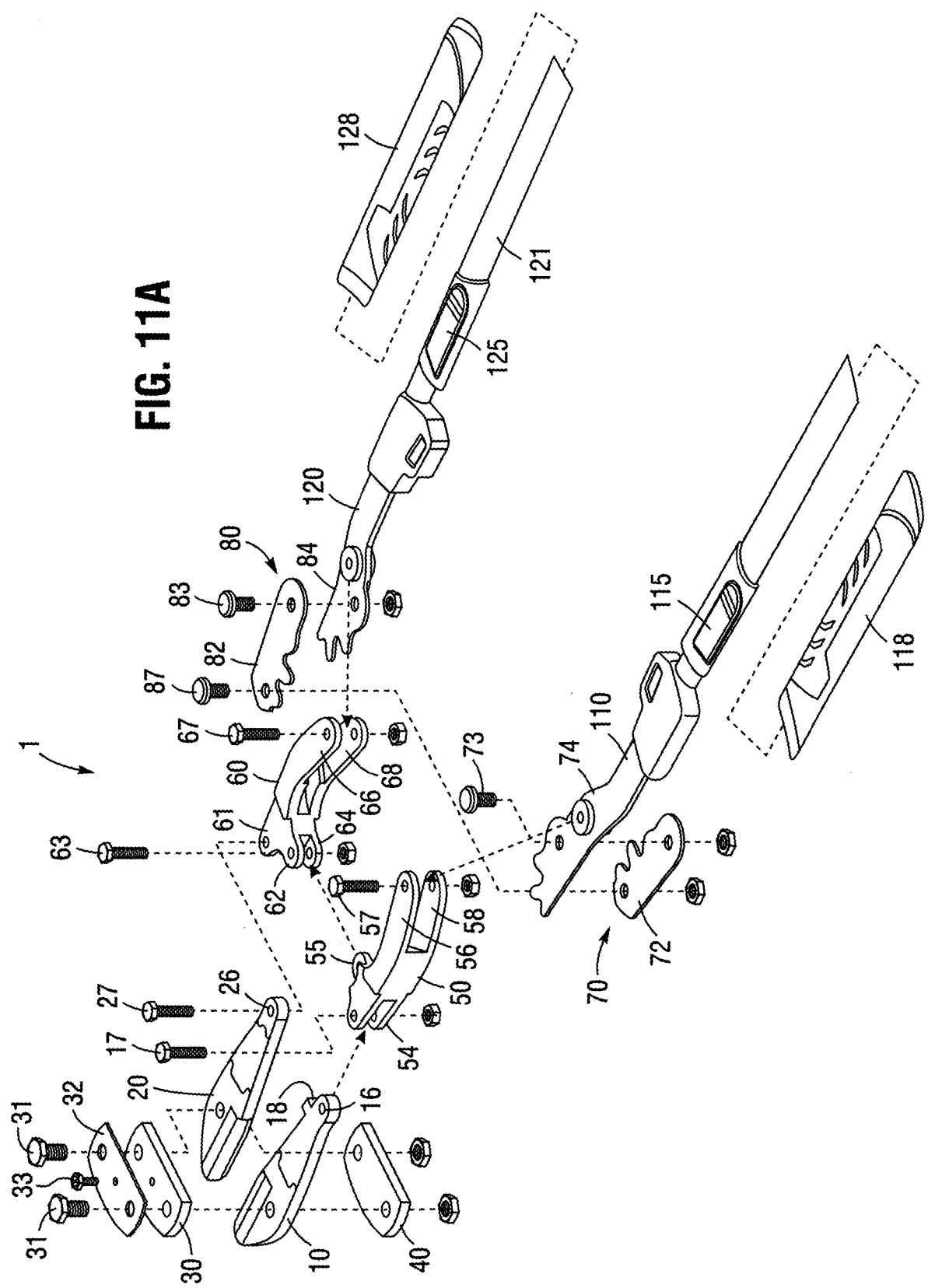

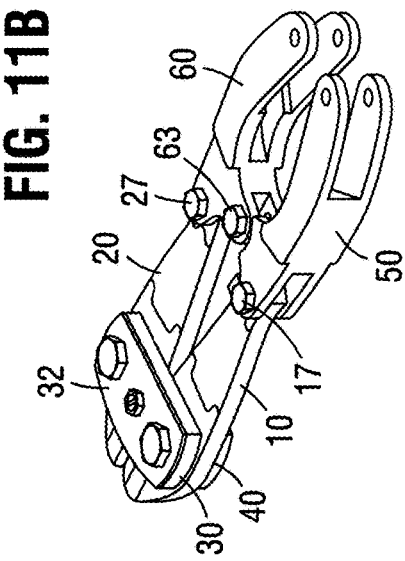
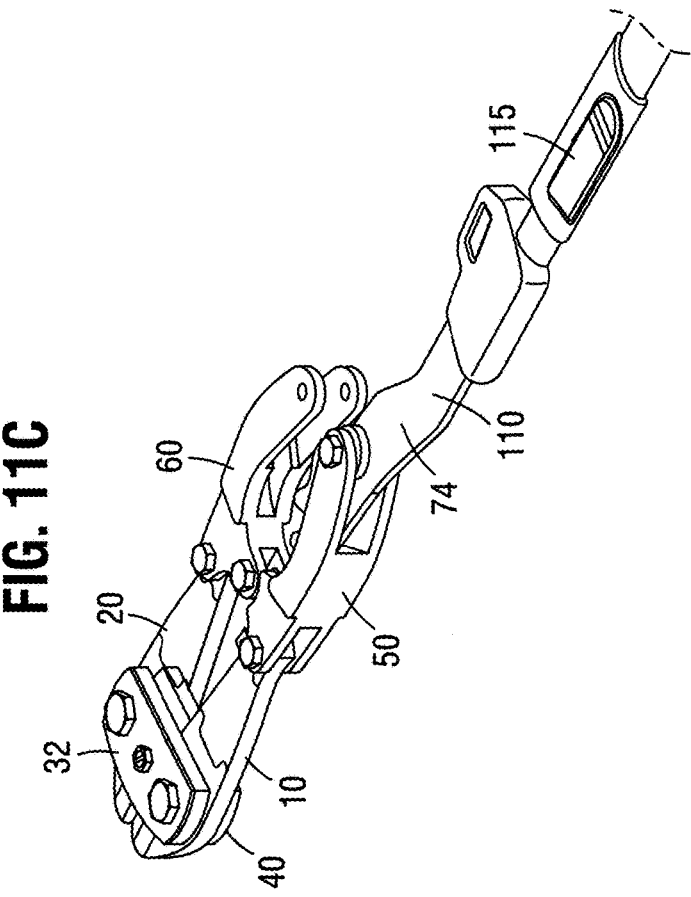
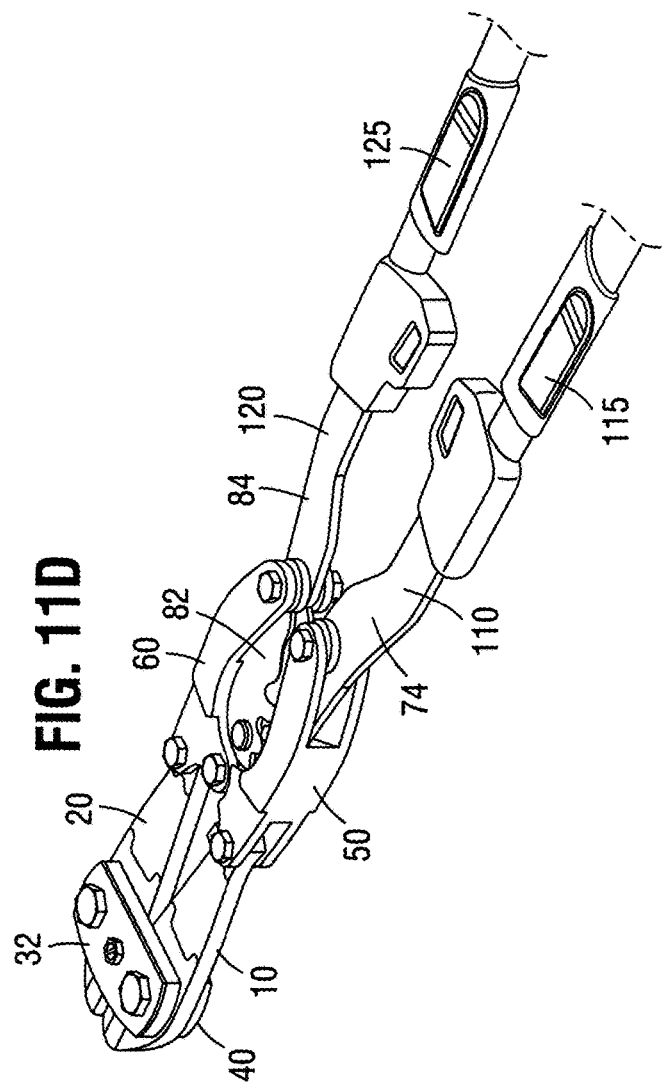

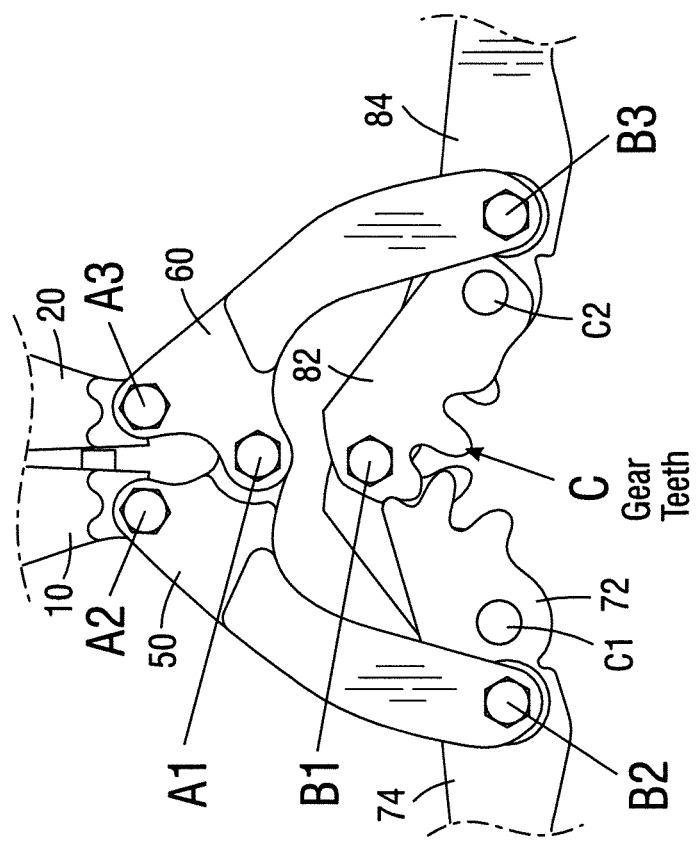
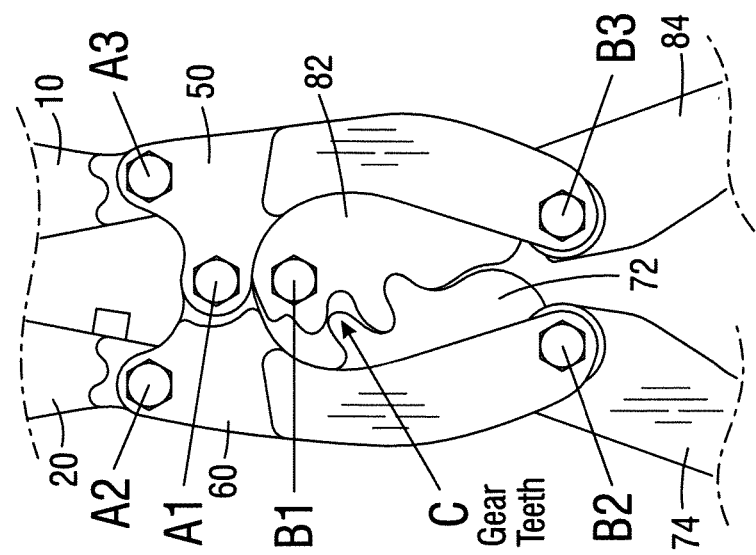

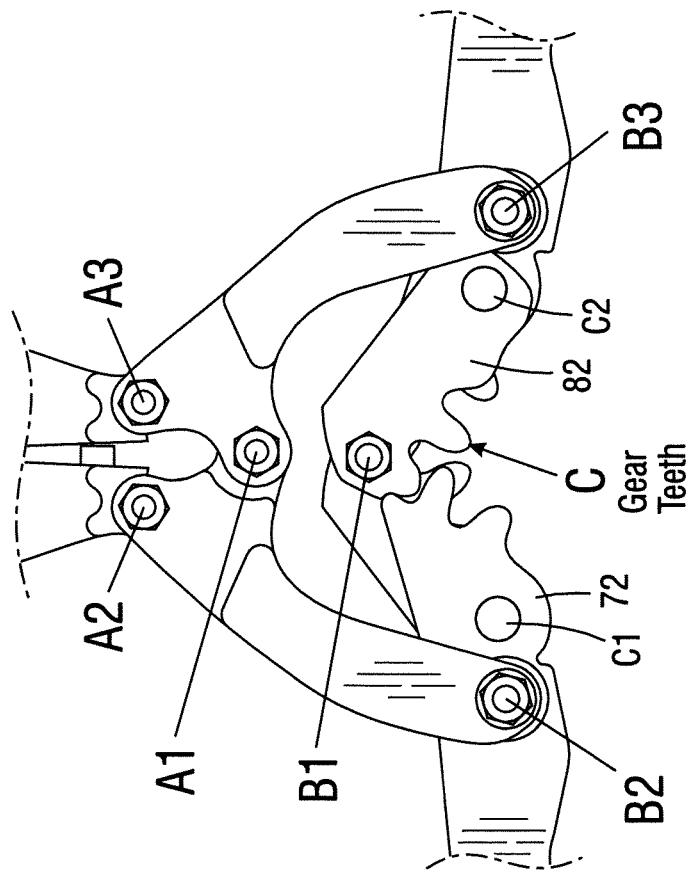
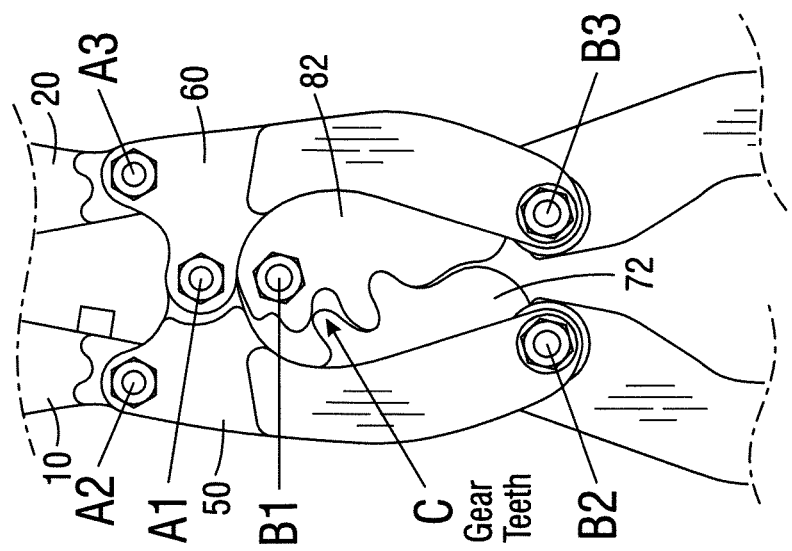

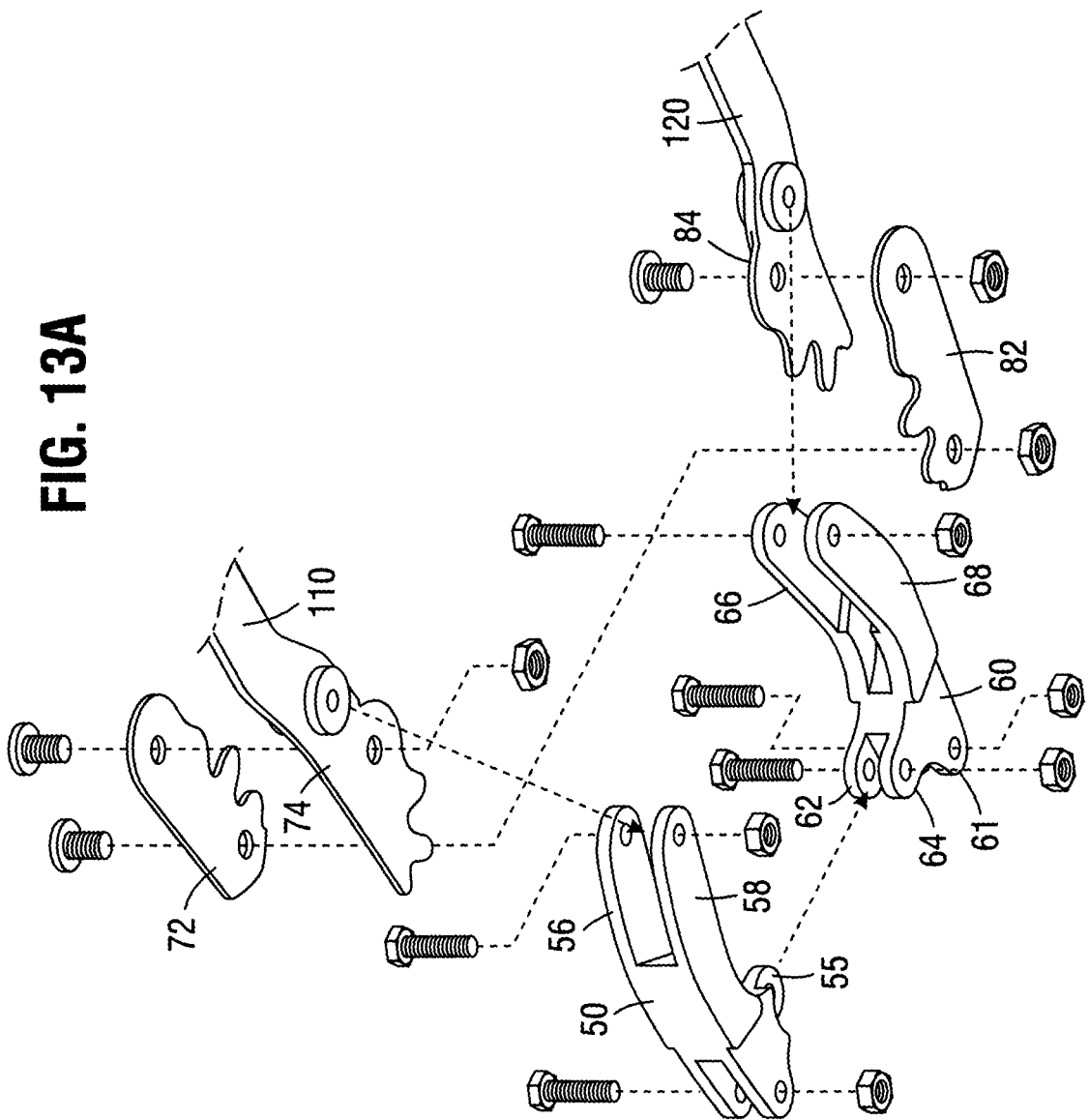

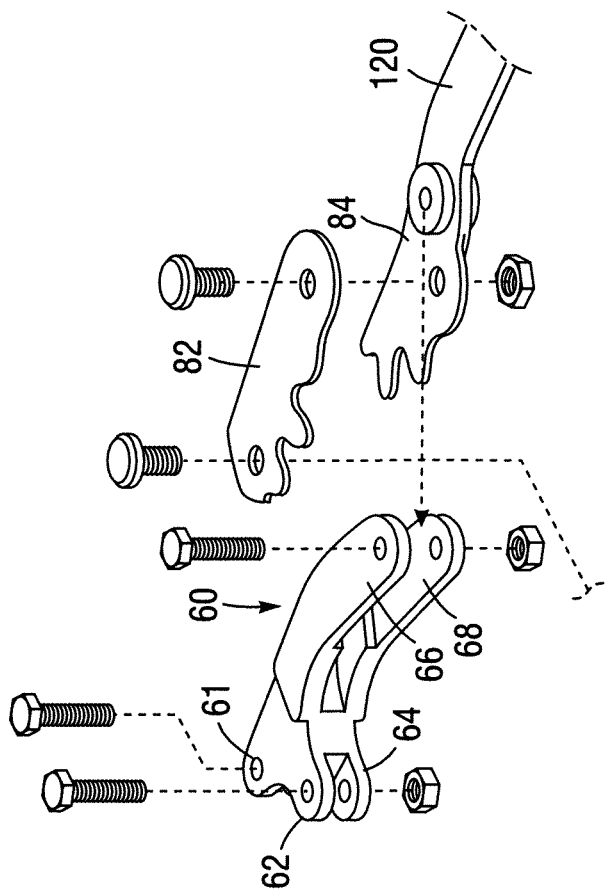
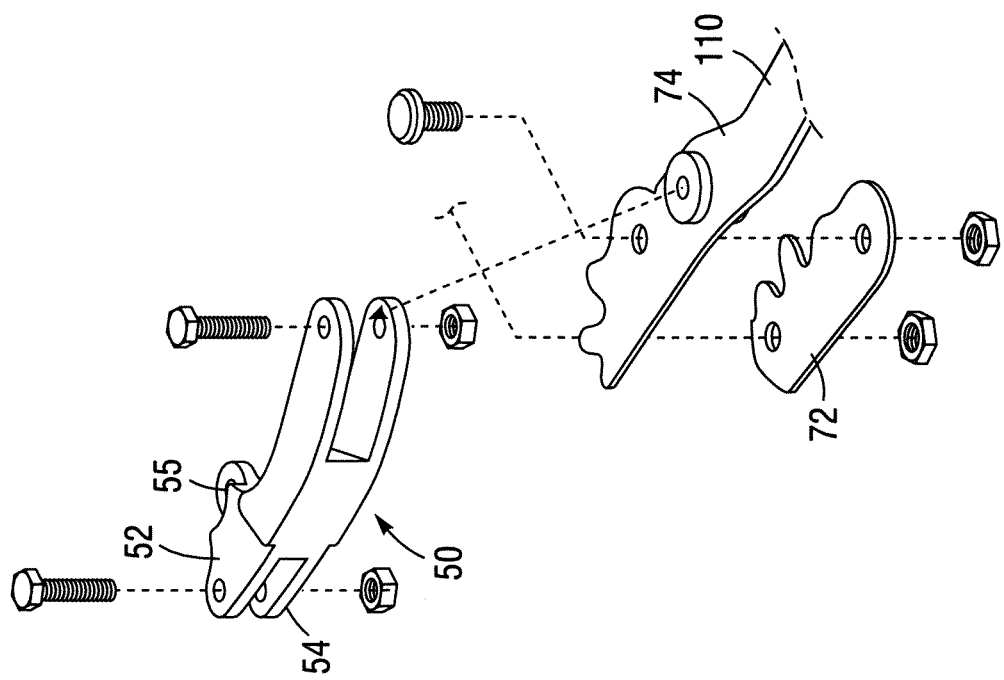

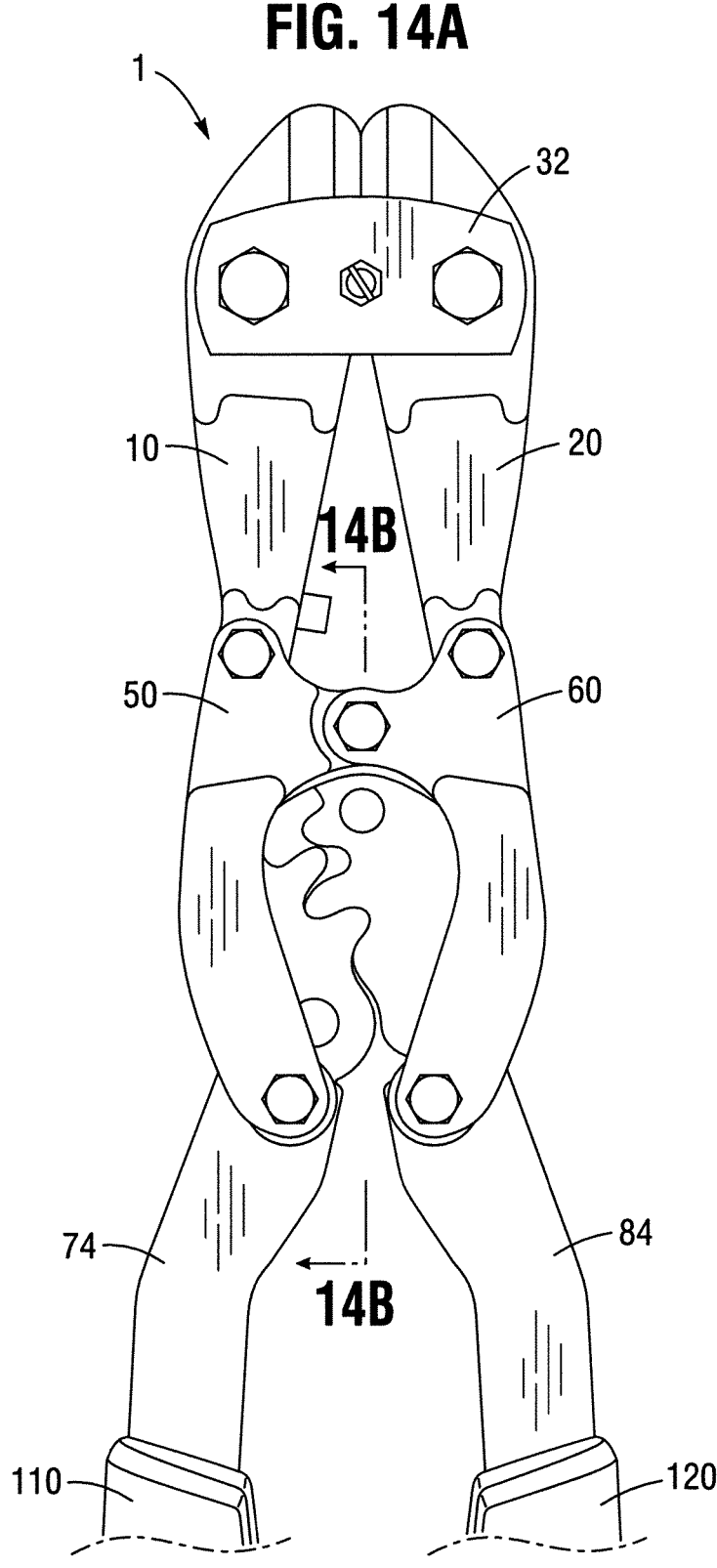
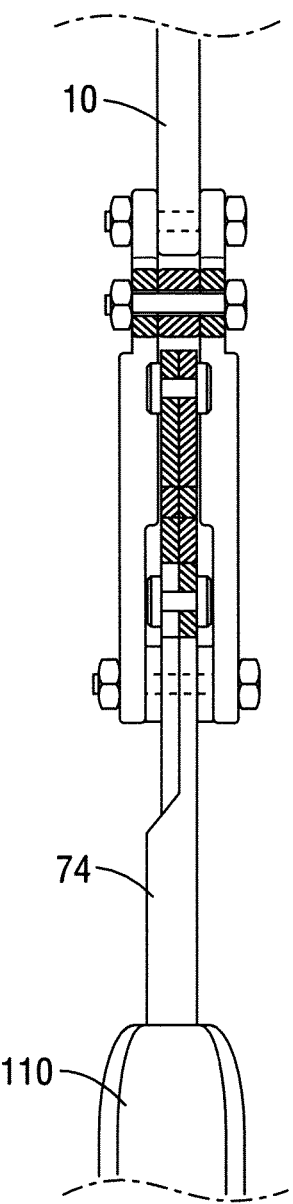
FIG. 14A
FIG. 14B

BOLT CUTTER WITH TRIPLE COMPOUND LEVERAGE

CROSS REFERENCE TO RELATED APPLICATIONS

This application claims the benefit of priority to U.S. Provisional Application Ser. No. 60/624,474 filed Jan. 24, 2024, the entire disclosure of which is incorporated herein by specific reference thereto.

FIELD OF INVENTION

This invention relates to hand tools and more particularly to hand tool bolt cutters and methods that are operated using one hand having a triple compound leverage, in order to easily cut through bolts, rebar, steel rods, and cables sized up to ⅜" in diameter, grade 5 and higher with ease, while holding the bolt cutter in both hands at chest level.

BACKGROUND AND PRIOR ART

Hand tools having two pivotally connected handles for moving jaws that a user operates with one hand are well known in the art. The basic tool has three parts: a unitary first member having a first handle on one end and a first jaw on the other end a unitary second member having a second handle on the one end and a second jaw on the other end, and an axle pivotally connecting the two together. Scissors and sheet metal snips are examples of such hand tools operated by one hand.

FIG. 1 is a prior art view of a 2008 hand tool (bolt cutter) providing double compound leverage in the jaws, which is the subject of U.S. Pat. No. 7,444,851 to Janson, which is incorporated by reference, and was invented by the same inventor as the subject patent application.

The '851 patent includes additional pivots and lever arms that increase the mechanical advantage of the hand tool. This is accomplished by adding center members between the jaw members and handle members to doubly compound the leverage provided by the handles on the jaws.

Bolt cutters come in many sizes 14 inch, 18 inch, 0.24 inch, 30 inch, and 36 inch. The '851 patent comes in all these sizes. but the most popular model is the 24 inch. Generally, the bolt cutter will list the parameters of what its capability is hardness thickness of metal et. But that being said most people don't rally pay attention to this. And in reality, the bolt cutter has difficulty cutting rods locks steel bolts et.

The 851-patent model is very good and has high leverage there is always room for improvement. when the 23 inch won't cut, you will have to go to a much larger bolt cutter say a 30 inch or 36 inch. But usually, you won't have these on hand so the job is interrupted and you will have to go out and purchase one of these bolt cutters which are more expensive. The 36 inch bolt cutter will cut 5/16 grade 5 at chest level but it is so heavy it will take 2 people to hold it up. That being said this new invention will do it in a 24 inch version at chest level.

Fire fighters or law enforcement may need to cut a lock at chest level involving an emergency situation. The 24 inch is easy to handle and would be a perfect solution where you wouldn't need two people to use it.

U.S. Pat. No. 7,444,851 to the subject inventor covers a double compound leverage bolt cutter that delivers approximately 30% increase in leverage over previous single compound leverage bolt cutter designs as measured by testing by APEX Tool Group in North Carolina USA.

FIG. 2A is a front view of a prior art 1886 bolt cutter shown and described in U.S. Pat. No. 361,339 to Pullman, which is incorporated by reference. FIG. 2B is an upper view of the bolt cutter of FIG. 2A with the lever arms in an open position. FIG. 2C is a side cross-sectional view of FIG. 2A. FIGS. 2A-2C show a bolt cutter with the upper ends of the lever arms having interlocking teeth when the lever arms are being pivoted open and closed.

Referring to FIGS. 2A-2C, the cutting head arms are connected to the center of each gear at the top ends of each handle.

The bolt cover shown in FIGS. 2A-2C never became a standard and is not being produced. In my opinion there is too much stress on the gear teeth as they are the first points of leverage with my design the bolt cutter has two layers of compound leverage in front of the gear set being in the $3^{rd}$ position. In the subject invention design, no one point of leverage is absorbing all the stress.

Handheld tools interlocking gears have been used with hedge shears, such as U.S. Pat. No. 6,789,324 to Lind'en et al., which is incorporated by reference.

FIG. 3A is a perspective view of a prior art double gear hedge shears covered in U.S. Pat. No. 6,789,324 to Lind'en et al., which is incorporated by reference. FIG. 3B is an enlarged top view of the gear portions of the shears of FIG. 3A.

Referring to FIGS. 3A-3B a gear set with teeth is shown on both sides.

FIG. 4 is an enlarged top view of a prior art a gear tree lopper from GARDENA Inc FIG. 5 is a front view of a prior art Double Compound Action Bolt Cutter, CRESCENT H.K. PORTER® sold in Home Depot®.

These prior art bolt cutters can require too much leverage to cut through larger bolts of 5/16" diameter. The user would have to position one leg/arm of the Home Depot bolt cutter on the ground and stand on the second leg/arm and have to jump up and down in order to cut through a 5/16" grade 5 bolt, which is both not desirable and dangerous to the user.

The prior art bolt cutters are not able to cut bolts having a grade 5 of being 5/16: in diameter and higher with ease.

Thus, the need exists for solutions to the above problems with the prior art.

SUMMARY OF THE INVENTION

A primary objective of the present invention is to provide a hand tool bolt cutters and methods that are operated using one hand having a triple compound leverage, in order to easily cut through bolts sized up to approximately 5/16" in diameter, grade 5 and higher with ease, while holding the bolt cutter in both hands at chest level.

A second objective of the present invention is to provide a hand tool bolt cutters and methods that are operated using one hand having a triple compound leverage, in order to easily cut through bolts sized up to approximately ⅜" in diameter, grade 5 and higher with ease, while holding the bolt cutter in both hands at chest level.

A third objective of the present invention is to provide a hand tool bolt cutters and methods that are operated using one hand having a triple compound leverage, in order to easily cut through cables, rebar, steel rods up to approximately ⅜" in diameter, grade 5 with ease, while holding the bolt cutter in both hands at chest level.

A fourth objective of the present invention is to provide a hand tool bolt cutters and methods that provides at least approximately 50% more leverage over existing single compound leverage bolt cutters.

An embodiment of the novel compound leverage bolt cutter, can include:

a first jaw member with an upper side cutting edge, a second jaw member with an upper side cutting edge, wherein the side cutting edge of the first jaw member faces the side cutting edge of the second jaw, a pair of plates which attach the first jaw member to the second jaw member together for allowing the upper side cutting edge of the first jaw member to pivot toward and away from the upper side cutting edge of the second jaw member, a first bracket having an upper end pivotally attached to a base of the first jaw member, and having an inwardly side protruding tab, a second bracket having an upper end pivotally attached to a base of the second jaw member, and having an inwardly side protruding tab, wherein the inwardly protruding tab of the first bracket is pivotally attached to the inwardly protruding tab of the second bracket, a first gear set pivotally attached to a base of the first bracket, the first et including a first plate having a cam surface portion with rounded teeth, that is pivotally attached to a first elongated gear plate, a second gear set pivotally attached to a base of the second bracket, the second gear set including a second plate having a cam surface portion with rounded teeth that mateably intermesh with the rounded teeth on the cam surface of the first gear plate, the second plate pivotally attached to a second elongated gear plate, a first elongated arm with a first handle attached to the first elongated gear plate; and a second elongated arm with a second handle attached to the second elongated gear plate, wherein a combination of the pivotally attached first and second brackets, with pivotal connections on the first gear set and the second gear set together create compound leverage pivoting combinations, wherein holding the first handle and the second handle at chest level increase leverage of the jaw members with respective cutting edges to cut through metal bolts, rebar, steel rods, and cables by the compound leverage pivoting combinations The metal bolts, rebar, steel rods and cables can include diameters of up to approximately 5/16" in diameter and up to a grade 5 in hardness.

The metal bolts, rebar, steel rods and cables can include diameters of up approximately 3/8" in diameter, and up to grade 5 in hardness.

The bolt cutter can provide at least approximately 50% more leverage over existing bolt cutters The compound leverage pivoting combinations, can include three compound leverage pivoting combinations.

The compound leverage pivot combinations can include a first compound leverage pivoting combination that comprises the inwardly protruding tab of the first bracket is pivotally attached to the inwardly protruding tab of the second bracket.

The compound leverage pivot combinations can include a second compound leverage pivoting combination that comprises the first gear plate of the first gear set pivotally attached to the second gear plate of the second gear set.

The compound leverage pivot combinations can include a combination of a third compound leverage pivoting combination that comprises the first gear teeth of first gear plate pivotally intermeshing with the second gear teeth of the second gear plate.

The compound leverage bolt cutter can further include a first button on the first handle, which when depressed allows the first arm to increase in length; and a second button on the second handle, which when depressed allows the second arm to increase in length.

A second embodiment of the compound leverage bolt cutter can include first handle and the second handle each include an elongated cylindrical member with an enlarged mid-section for enhancing gripping action of the first handle and the second handle.

An improved leverage bolt cutter with a plurality of leverage connections, can include a cutting head that includes a first jaw with a first cutting edge, and a second jaw with a second cutting edge, the first jaw being pivotally attached to the second jaw and moveable from a first position to a second position, the first position has the first cutting edge and the second cutting edge spaced apart from one another, and the second position has the first cutting edge moves to abut against the second cutting edge to cut through metal bolts, rebar, steel rods and cables, wherein one of the plurality of leverage connections includes a set of meshing gears.

The improved leverage bolt cutter can include a first handle having an upper end attached to one gear set with first gear teeth, and a second handle having an upper end attached to a second gear set with second gear teeth, wherein moving the handles from an expanded position to a closed position causes the first gear teeth to intermesh with the second gear teeth.

The metal bolts, rebar, steel rods and cables can include diameters of up to approximately 5/16" in diameter and up to a grade 5 in hardness.

The metal bolts, rebar, steel rods and cables can include diameters of up approximately 3/8" in diameter, and up to grade 5 in hardness.

The improved leverage bolt cutter can provide at least approximately 50% more leverage over existing single compound leverage bolt cutters.

The improved leverage bolt cutter can include the first handle and the second handle each include an elongated cylindrical member with an enlarged mid-section for enhancing gripping action of the first handle and the second handle.

A method for improving leverage in a bolt cutter, can include the steps of: providing a cutting head that includes a first jaw with a first cutting edge, and a second jaw with a second cutting edge, providing the first jaw being pivotally attached to the second jaw and moveable from a first position to a second position, providing a plurality of pivoting members attached to the first jaw and the second jaw, providing a set of meshing gears as at least one of the plurality of pivoting members, providing the first position has the first cutting edge and the second cutting edge spaced apart from one another, and providing the second position has the first cutting edge moves to abut against the second cutting edge to cut through metal bolts, rebar, steel rods and cables, wherein one of the plurality of leverage connections includes a set of meshing gears.

The method can include the metal bolts, rebar, steel rods and cables include diameters of up to approximately 5/16" in diameter and up to a grade 5 in hardness.

The method can include the metal bolts, rebar, steel rods and cables include diameters of up approximately 3/8" in diameter, and up to grade 5 in hardness.

The method can include the bolt cutter provides at least approximately 50% more leverage over existing single compound leverage bolt cutters.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 2A is a front view of a prior art 1886 bolt cutter.

FIG. 2B is an upper view of the bolt cutter of FIG. 2A with the lever arms in an open position.

FIG. 2C is a side cross-sectional view of FIG. 2C.

First Embodiment

Figure 6:
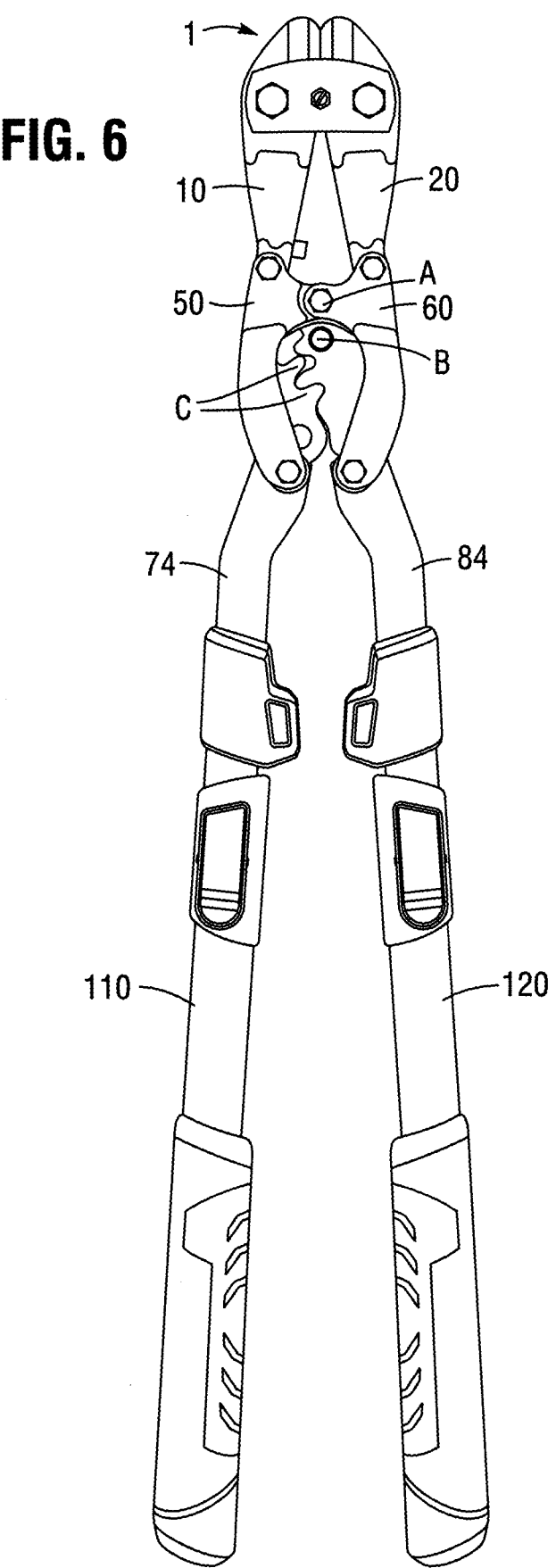

FIG. 6 is a front view of the novel triple compound leverage bolt cutter in a closed position with labels A, B, C for the three compound leverages.

Figure 7A:
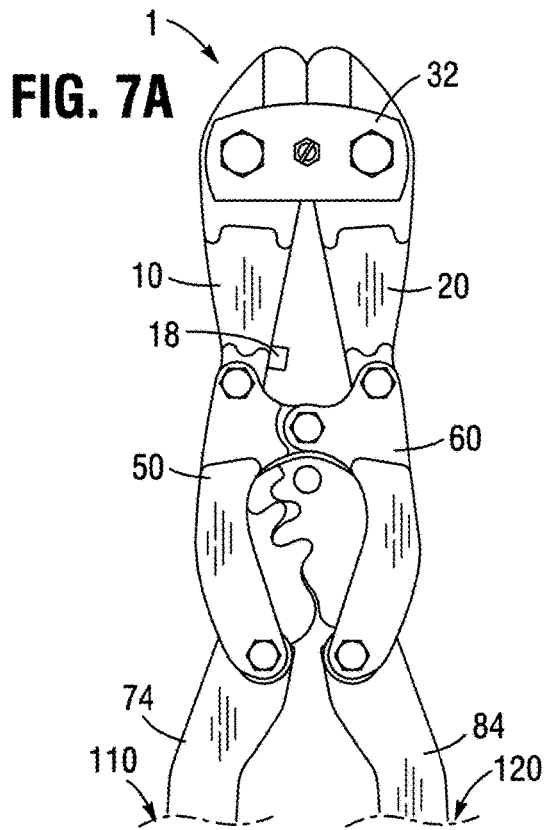

FIG. 7A is an upper front partial view of the gears and pivot locations of the novel bolt cutter of FIG. 6 in a closed position.

Figure 7B:
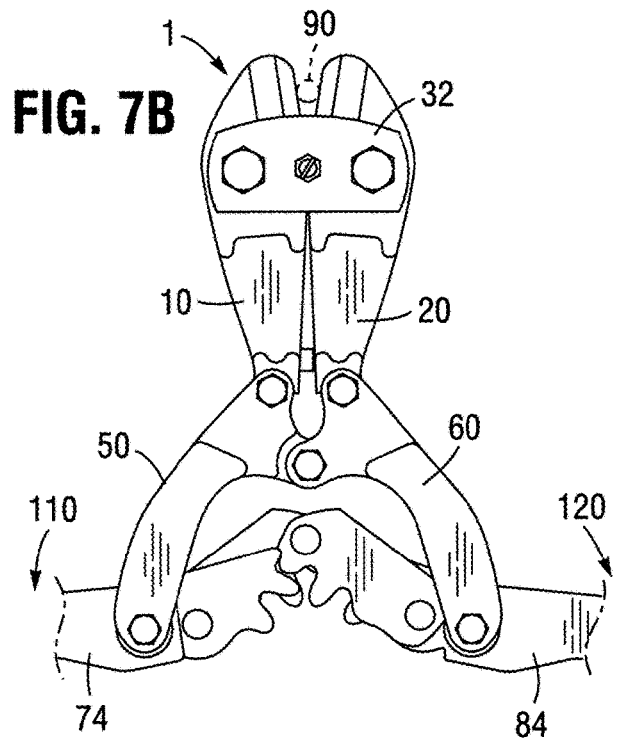

FIG. 7B is an upper front view of the gears and pivot locations of the novel bolt cutter of FIG. 7A with arms spread out and jaws about to cut a bolt.

Figure 7C:
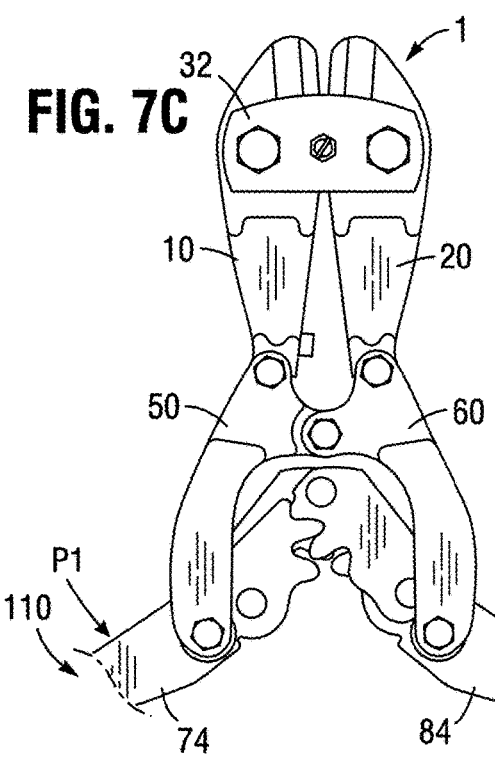

FIG. 7C is an upper front view of the bolt cutter of FIG. 7B with arms starting to move downward and jaws cutting into the bolt.

Figure 7D:
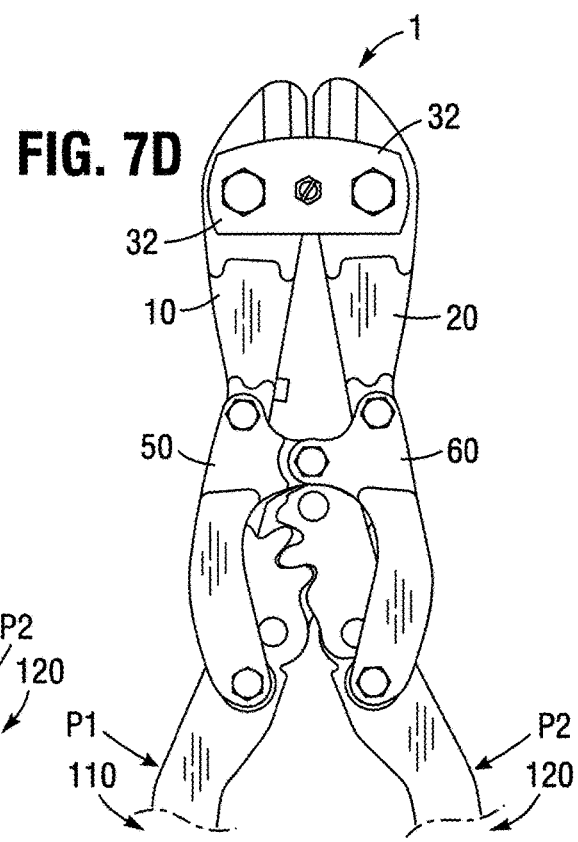

FIG. 7D is an upper front view of the bolt cutter of FIG. 7C with arms continue to move downward and jaws cutting into the bolt.

Figure 8A:
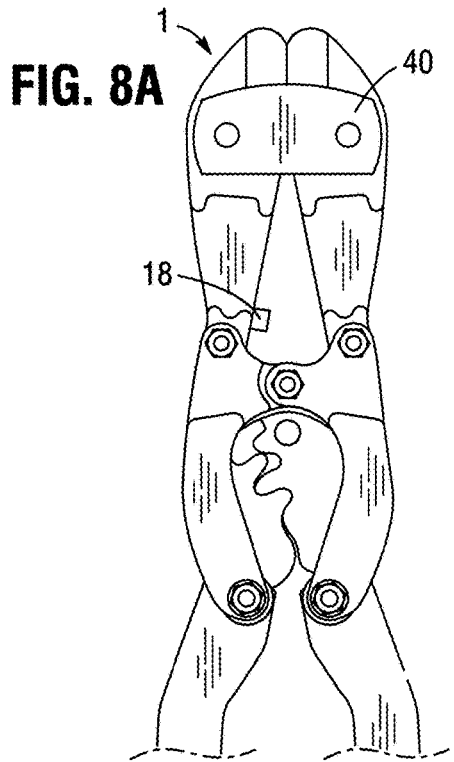

FIG. 8A is an upper rear partial view of the gears and pivot locations of the novel bolt cutter of FIG. 6 in a closed position.

Figure 8B:
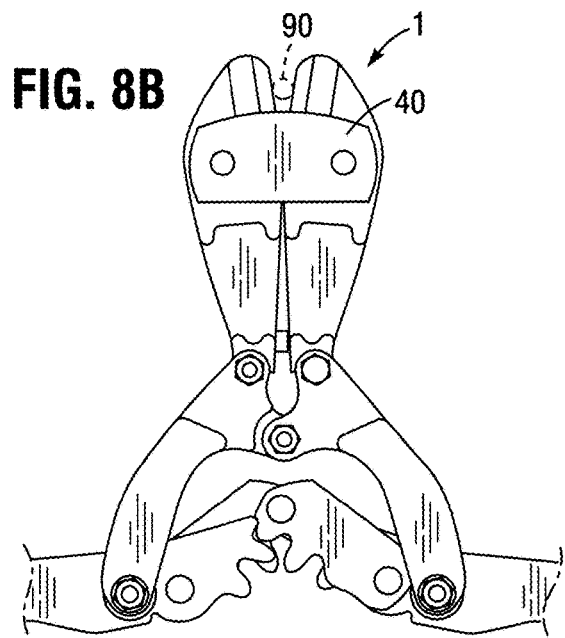

FIG. 8B is an upper rear view of the gears and pivot locations of the novel bolt cutter of FIG. 8A with arms spread out and jaws about to cut a bolt.

Figure 8C:
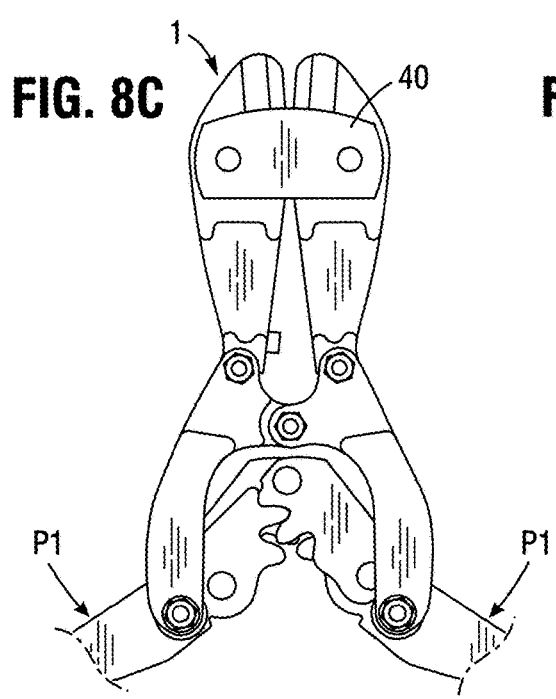

FIG. 8C is an upper rear view of the bolt cutter of FIG. 8B with arms starting to move downward and jaws cutting into the bolt.

Figure 8D:
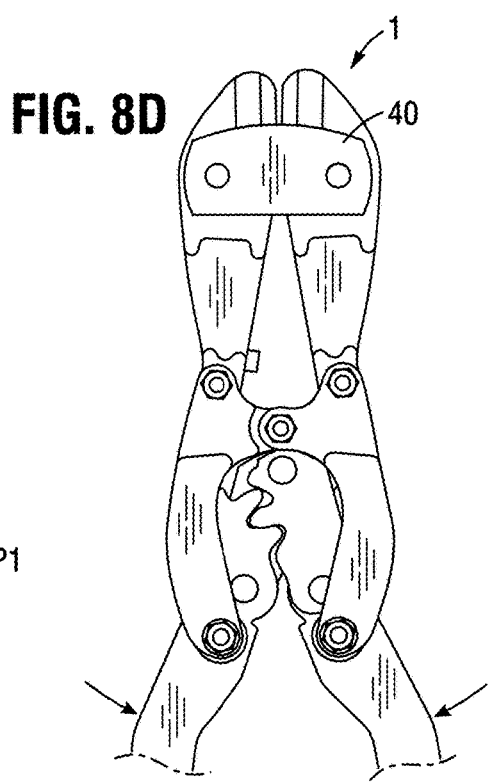

FIG. 8D is an upper front view of the bolt cutter of FIG. 8C with arms continue to move downward and jaws cutting into the bolt.

FIG. 9A is a front perspective view of the bolt cutter of FIG. 6 in a closed position.

FIG. 9B is an enlarged perspective view of the button leg extender button in FIG. 9A.

FIG. 10 is a cross-sectional view of the button of FIG. 9B along arrows 10.

FIG. 11A is an exploded perspective view of the bolt cutter of FIG. 6.

FIG. 11B is an assembled perspective view of jaw members with their mounting plates and first and second curved brackets of the bolt cutter of FIG. 11A.

FIG. 11C is an assembled perspective view of FIG. 11B with first handle arm and button.

FIG. 11D is an assembled perspective view of FIG. 11C with both first and second handle arms attached.

FIG. 12A is a front view of pivot points of the bolt cutter of FIGS. 6-11D that form compound leverage A, B and C, in a closed position.

FIG. 12B is a front view of pivot points of the bolt cutter of FIGS. 6-11D that form compound leverage A, B and C, in an open position.

FIG. 12C is a rear view of pivot points of the bolt cutter of FIGS. 6-11D that form compound leverage A, B and C, in a closed position, with the intermeshing gear teeth forming the compound leverage C, in FIG. 11.

FIG. 12D is a rear view of pivot points of the bolt cutter of FIGS. 6-11D that form compound leverage A, B and C, in an open position.

FIG. 13A is a lower left exploded view of the first curved bracket, second curved bracket, first handle arm, first gear plate, second handle arm, second gear plate with pivot connection components of FIG. 11A.

Figure 13B:
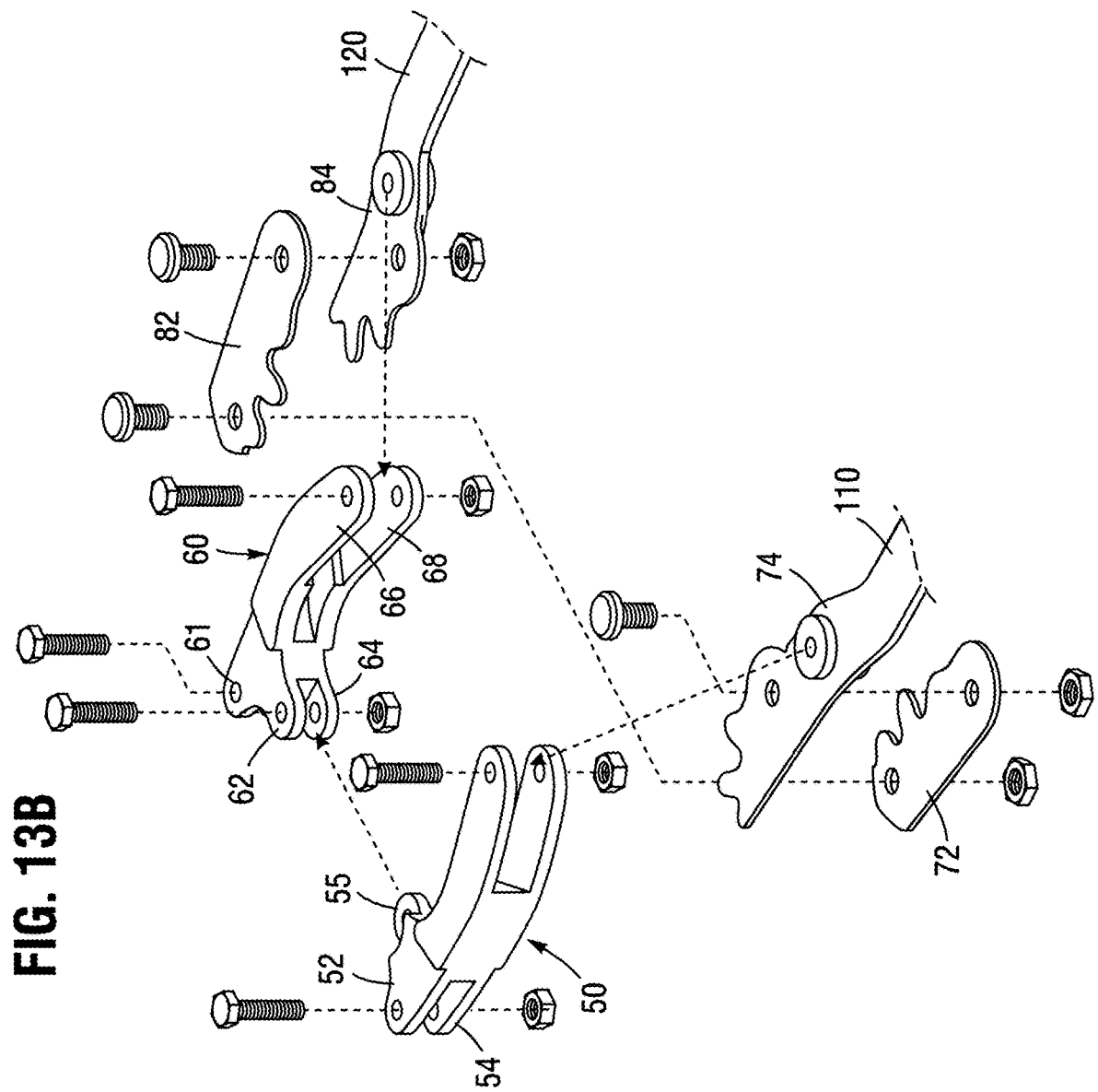

FIG. 13B is an upper left exploded view of the first curved bracket, second curved bracket, first handle arm, first gear plate, second handle arm, second gear plate with pivot connection components of FIG. 13A.

FIG. 13C is an upper left exploded view of the first curved bracket, first handle arm, first gear plate with pivot connection components of FIG. 13A.

FIG. 13D is an upper left exploded view of the second curved bracket, second handle arm, second gear plate, and pivot connection components of FIG. 13A.

FIG. 14A is another upper front partial view of the gears and pivot locations of the novel bolt cutter of FIG. 6 in a closed position.

FIG. 14B is a cross-sectional view of the bolt cutter of FIG. 14A along arrows 14B.

Second Embodiment

Figure 15A:
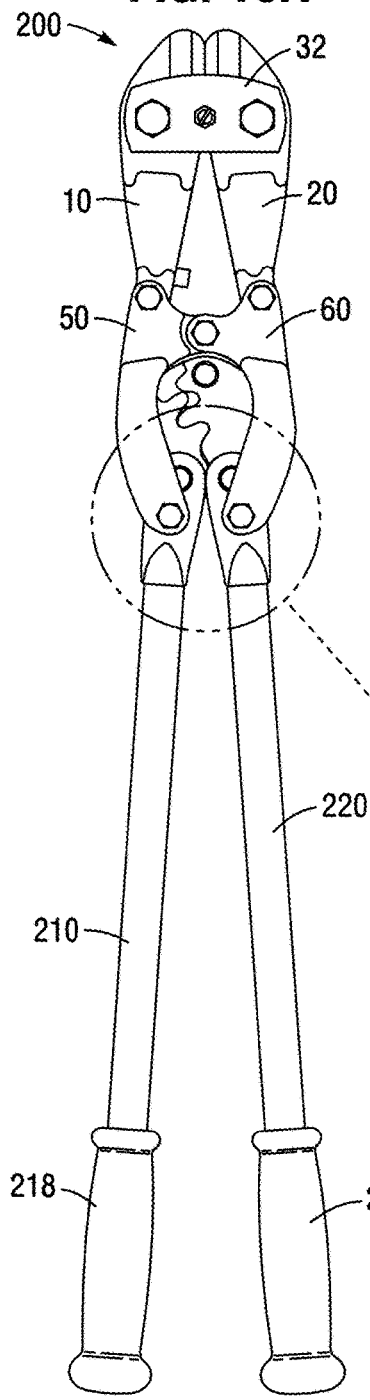

FIG. 15A is a front view of a second embodiment novel triple compound leverage bolt cutter in a closed position with different handles.

Figure 15B:
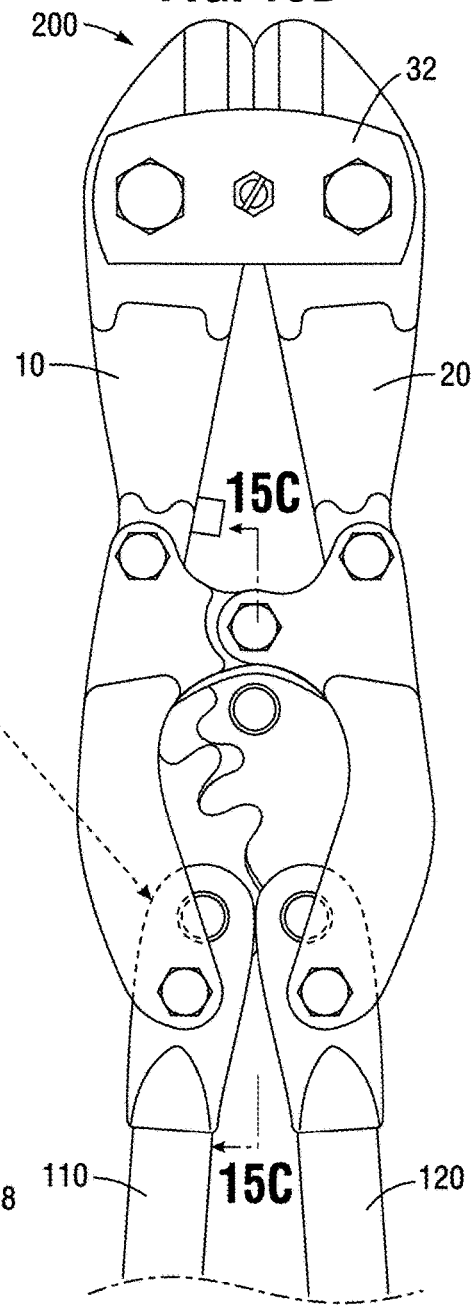

FIG. 15B is an enlarged upper front partial view of the gears and pivot locations of the novel bolt cutter of FIG. 15A in a closed position.

Figure 15C:
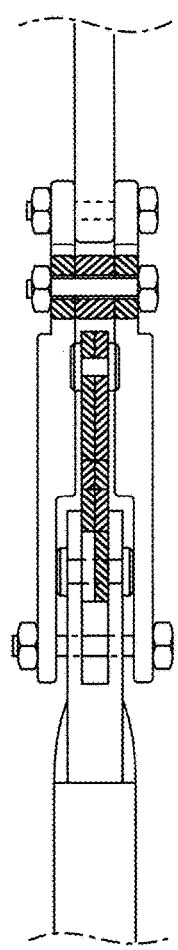

FIG. 15C is a side cross-sectional view of FIG. 15B along arrows 15C.

Third Embodiment

Figure 16B:
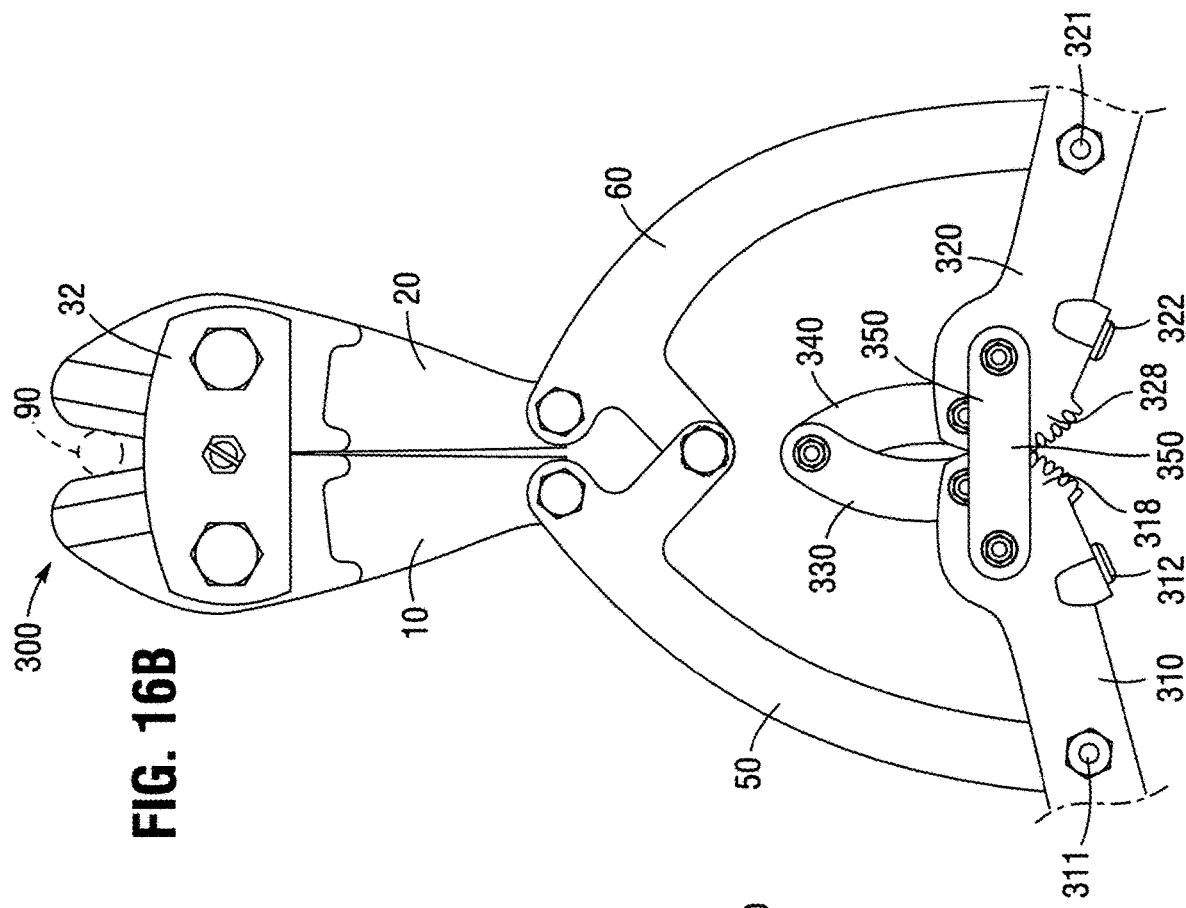
Figure 16A:
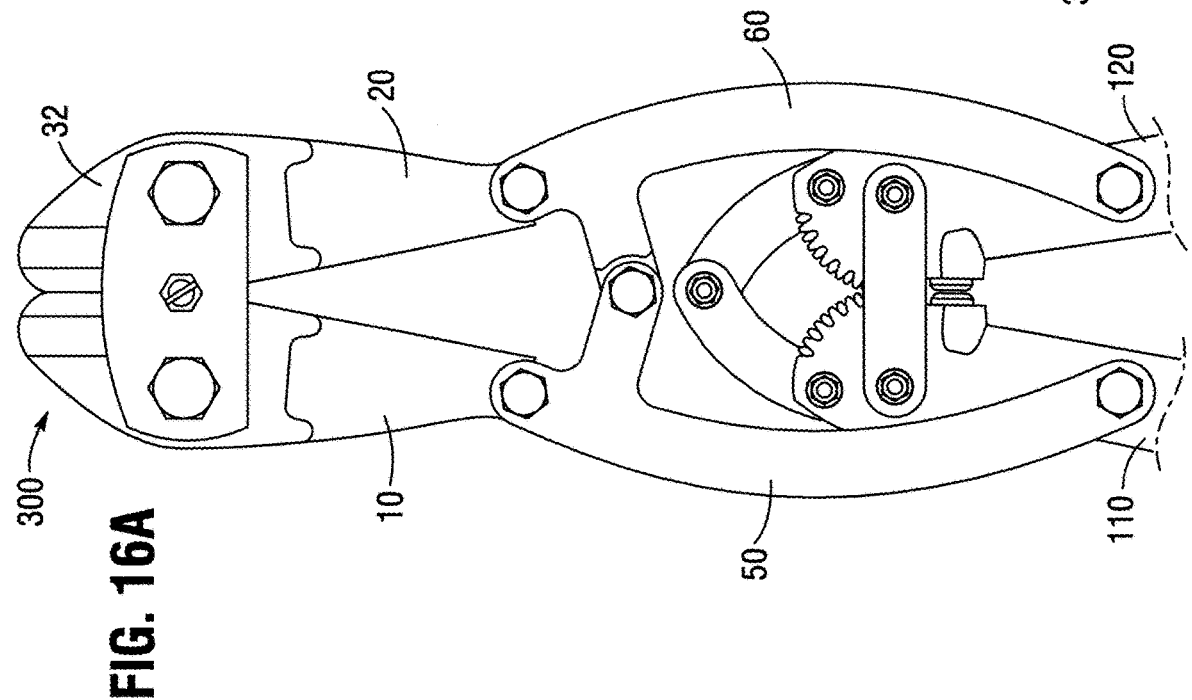

FIG. 16A is an enlarged upper front partial view of the gears and pivot locations of a third embodiment novel bolt cutter of FIG. 6 in a closed position.

FIG. 16B is an upper front view of the gears and pivot locations of the novel bolt cutter of FIG. 16A with arms spread out and jaws about to cut a bolt.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally. In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.
A First compound leverage
B Second compound leverage
C Third compound leverage
1 triple compound leverage bolt cutter first embodiment
10 first jaw member
16 bottom tab
17 pivot bolt/screw with mateable nut
18 stopper
20 second jaw member
26 bottom tab
27 pivot bolt/screw with mateable nut
30 front plate
31 pair screws/bolts with mateable nuts
33 single screw/bolt
32 cover plate
40 rear plate
50 first curved bracket
52 upper top tab
54 upper bottom tab
55 side protruding tab
56 lower top tab
57 single screw/bolt with mateable nut
58 lower bottom tab
60 second curved bracket
61 single top tab
62 upper side tab
63 single screw/bolt with mateable nut
64 bottom side tab
66 lower top tab
67 single screw/bolt with mateable nut
68 lower bottom tab
70 first gear set
72 first separate gear plate
73 single screw/bolt with mateable nut
74 first bottom gear plate extending from top of first handle arm 110
80 second gear set
82 second separate gear plate
83 single screw/bolt with mateable nut
84 second bottom gear plate extending from top of second handle arm 120
87 single screw/bolt with mateable nut
90 bolt
110 first handle arm
115 first handle extension button
118 first handle grip
120 second handle arm
121 outer cylinder
125 second handle extension button
127 downward tab
128 second handle grip
129 Slots in second handle arm
200 second embodiment triple compound leverage bolt cutter
210 first handle arm
218 first handle grip
220 second handle arm
228 second handle grip
300 third embodiment triple compound leverage bolt cutter
310 first gear set with concave teeth
311 first pivot end
312 first stopper
318 concave teeth of first gear set
320 second gear set with concave teeth
321 first pivot end
322 second stopper
328 concave teeth of second gear set
330 first curved arm with pivoting ends
340 second curved arm with pivoting ends
350 center plate which ends that pivot to first get set and second gear set First Embodiment FIG. 6 is a front view of the novel triple compound leverage bolt cutter 1 in a closed position, with A for the first compound pivot, B for the second compound pivot, and C for the third compound pivot.

FIG. 7A is an upper front partial view of the gears and pivot locations of the novel bolt cutter 1 of FIG. 6 in a closed position with first bottom gear plate 74 attached to first handle arm, 110 and second bottom gear plate 84 attached to second handle arm 120 generally parallel.

FIG. 7B is an upper front view of the gears and pivot locations of the novel bolt cutter 1 of FIG. 7A with arms 110, 120 spread outward (apart) and jaws 10, 20 about to cut a bolt 90. A stopper 18 on a lower inner surface of first jaw member 10 limits the movement of the lower inner surfaces of the jaw members 10, 20 to each other when the arms 110, 120 are spread apart from one another.

FIG. 7C is an upper front view of the bolt cutter 1 of FIG. 7B with arms 110, 120 starting to move downward in the direction of arrow P1 and jaws 10, 20 cutting into the bolt 90.

FIG. 7D is an upper front view of the bolt cutter 1 of FIG. 7C with arms 110, 120 continue to move downward in the direction of arrow P2 and jaws 10, 20 cutting into the bolt 90.

FIG. 8A is an upper rear partial view of the gears and pivot locations of the novel bolt cutter 1 of FIG. 6 in a closed position.

FIG. 8B is an upper rear view of the gears and pivot locations of the novel bolt cutter 1 of FIG. 8A with arms spread out and jaws about to cut a bolt 90.

FIG. 8C is an upper rear view of the bolt cutter1 of FIG. 8B with arms starting to move downward and jaws cutting into the bolt.

FIG. 8D is an upper front view of the bolt cutter 1 of FIG. 8C with arms continue to move downward and jaws cutting into the bolt.

FIG. 9A is a front perspective view of the bolt cutter of FIG. 6 in a closed position.

FIG. 9B is an enlarged perspective view of the button leg extender button in FIG. 9A.

FIG. 10 is a cross-sectional view of the button 125 of FIG. 9B along arrows X.

Referring to FIGS. 9A-11A, the depressible button 125 is affixed to an outer cylinder 121 that is part of second grip 128. Button 125 has lower tab 127 that can be inserted into anyone of slots 129 in the exterior of second arm 120. Second arm 120 can be moved into and out of outer cylinder 121 to either retract or extend arm 120 to different elongated lengths as desired.

A similar button 115 arrangement can exist on the first handle arm to allow first handle arm to retract or extend to different elongated lengths as desired.

FIG. 11A is an exploded perspective view of the bolt cutter 1 of FIG. 6. FIG. 12 is a front view of the pivot brackets 50, 60 and gear pivot plates 72, 74, 82, 84 in FIG. 11.

FIG. 11B is an assembled perspective view of jaw members 50, 60 with mounting plates 30, 32, 40 and first and second curved brackets 50, 60 of the bolt cutter 1 of FIG. 11A.

FIG. 11C is an assembled perspective view of FIG. 11B with first handle arm 74, 110 and button 115.

FIG. 11D is an assembled perspective view of FIG. 11C with both first and second handle arms 74, 110, 84, 120 attached.

FIG. 12A is a front view of pivot points of the bolt cutter 1 of FIGS. 6-11D that form compound leverage A, B and C, in a closed position.

FIG. 12B is a front view of pivot points of the bolt cutter 1 of FIGS. 6-11D that form compound leverage A, B and C, in an open position.

FIG. 12C is a rear view of pivot points of the bolt cutter 1 of FIGS. 6-11D that form compound leverage A, B and C, in a closed position.

FIG. 12D is a rear view of pivot points of the bolt cutter 1 of FIGS. 6-11D that form compound leverage A, B and C, in an open position.

Referring to FIGS. 12A-12D, the bolt cutter 1, include three compound leverage pivoting combinations A, B and C Compound pivoting combination A combines three pivoting points, labelled as A1, A2 and A3. Compound pivoting combination B combines three pivoting points, labelled as B1, B2 and B3.

Compound pivoting combination C combines the intermeshing gear teeth of first separate gear plate 72 of first gear set 70, and second separate gear plate 82 of second gear set 80 as the gear teeth are intermeshing together, along with the first bottom gear plate 74 and second bottom gear plate, further shown and described in FIGS. 13A-13D.

The compound pivoting combination C further includes pivot points C1 and C2.

FIG. 13A is a lower left exploded view of the first curved bracket 50, second curved bracket 60, first handle arm 110, first gear plate 70, second handle arm 120, second gear plate 82 with pivot connection components of FIG. 11A.

FIG. 13B is an upper left exploded view of the first curved bracket 50, second curved bracket 60, first handle arm 110, first gear plate 70, second handle arm 120, second gear plate 82 with pivot connection components of FIG. 13A.

FIG. 13C is an upper left exploded view of the first curved bracket 50, first handle arm 110, first gear plate 70 with pivot connection components of FIG. 13A.

FIG. 13D is an upper left exploded view of the second curved bracket 60, second handle arm 120, second gear plate 80, and pivot connection components of FIG. 13A.

Referring to FIGS. 11A, 11B, 11C and 12A-13D, the bolt cutter 1 can include first jaw member 10 with upper inward cutting edge, and second jaw member 20 with upper inward cutting edge, front plate 30 with cover plate 32 that sandwich the first and second jaw members 10, 20, with a rear plate 40.

A pair of screws/bolts 31 with mateable nuts attach the front plate 30 to the rear plate 40, and a single screw/bolt 33 attaches the cover plate 32 to the front plate 30. Screws/bolts 31 passing through openings in both jaw members 10, 20 allow pivoting action of the upper inward cutting edge of first jaw member 10 to and from the upper inward cutting edge of second jaw member 20, which is limited by stopper 18.

Bottom tab 16 of first jaw member 10 can fit between upper top tab 52 and upper bottom tab 54 of first curved bracket 50 with a pivot bolt/screw 17 passing through openings with mateable nuts allowing pivoting action between the first jaw member 10 and first curved bracket 50. Bottom tab 26 of second jaw member 20 can fit between upper top tab 62 and upper bottom tab 64 of second curved bracket 60 with a pivot bolt/screw 27 passing through openings with mateable nut allowing pivoting action between the second jaw member 20 and the single top tab 61 of the second curved bracket 60.

Side protruding tab 55 of first curved bracket 50 can fit between upper side tab 62 and bottom side tab 64 of second curved bracket 60, and a single screw/bolt 63 passing through openings with mateable nut allowing pivoting action between first curved bracket 50 and second curved bracket 60.

Single screw/bolt 57 passes into through-hole in lower top tab 56 through a through-hole in first bottom gear plate 74 and through a through-hole in lower bottom tab 58, to a mateable nut, to form a pivoting arrangement.

Single screw/bolt 67 passes into through-holes in lower top tab 66 and lower bottom tab 68

Screw/bolt 73 passes through a different through-hole in first bottom gear plate 74, to a mateable nut, to form another pivoting arrangement.

A single screw/bolt 83 passes through a through-hole in second separate gear plate 82, and through a through-hole in second bottom gear plate 84 with mateable nut, to form another pivoting arrangement.

A single screw/bolt 87 passes through a through-hole in second separate gear plate 82 and through another through-hole in first separate gear plate 72 with mateable nut to form another pivoting arrangement.

FIG. 14A is another upper front partial view of the gears and pivot locations of the novel bolt cutter 1 of FIG. 6 in a closed position.

FIG. 14B is a cross-sectional view of the bolt cutter 1 of FIG. 14A along arrows 14B.

Second Embodiment

FIG. 15A is a front view of a second embodiment novel triple compound leverage bolt cutter 200 in a closed position with first handle arm 210, second handle arm 220 with different handles 218, 228. The second embodiment 200 includes the same three compound leverage pivoting combinations A, B and C, as in the first embodiment bolt cutter 1, previously described.

Figure 1:
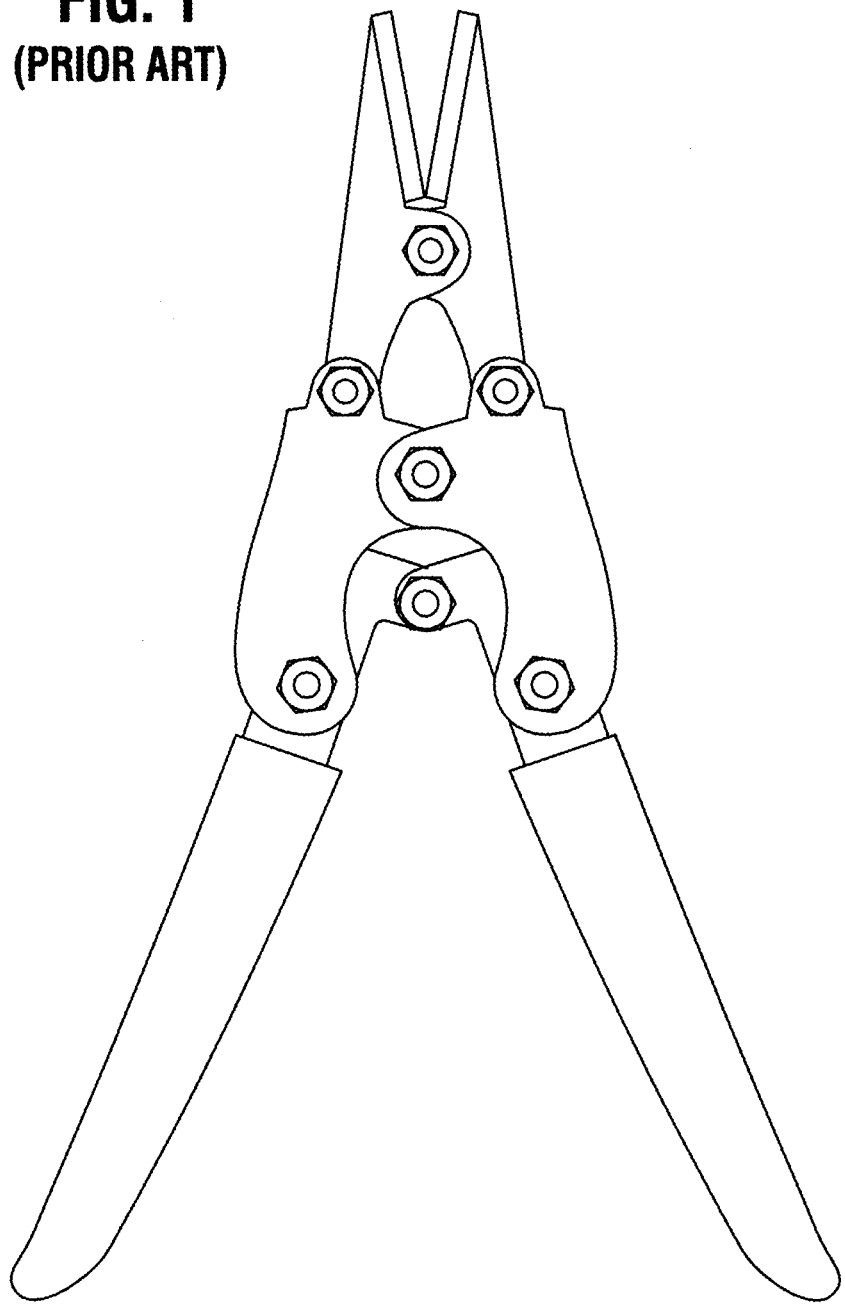
FIG. 1 is a prior art view of a 2008 hand tool (bolt cutter) providing double compound leverage in the jaws.
Figure 3A:
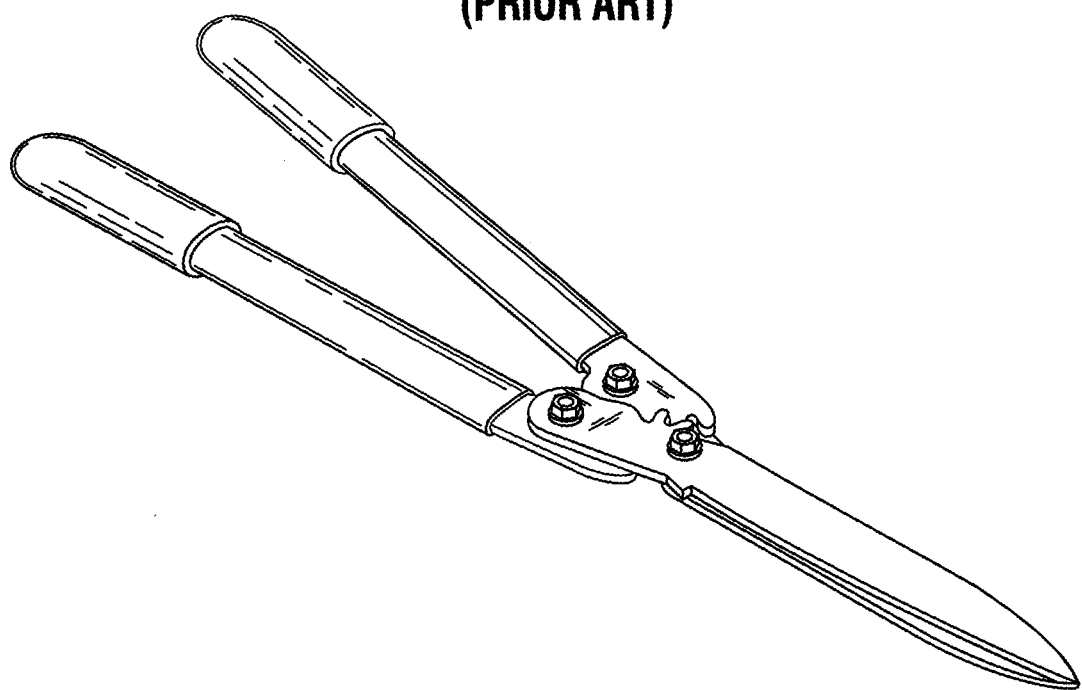
FIG. 3A is a prior art perspective view of a double gear hedge shears.
Figure 3B:
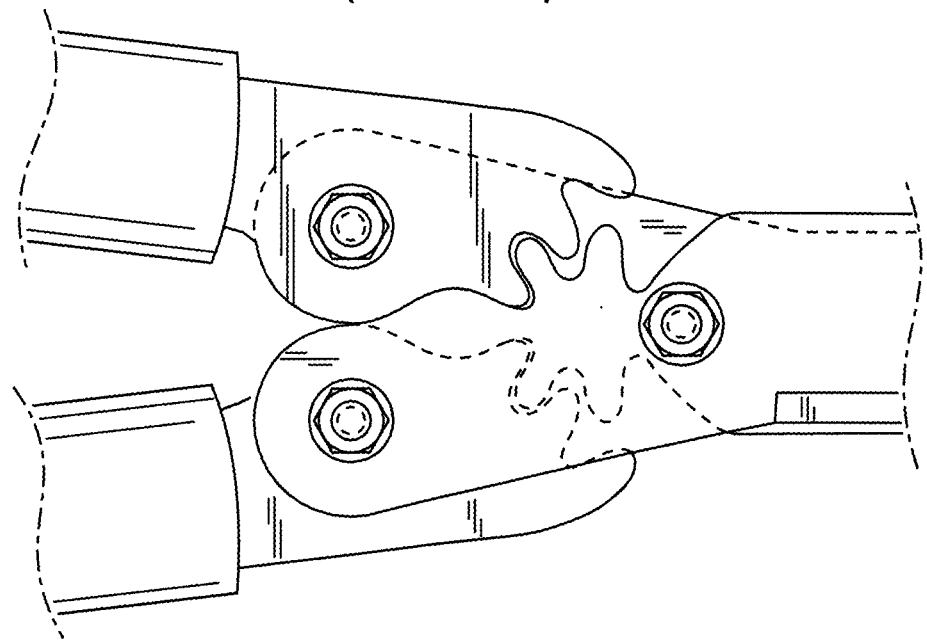
FIG. 3B is an enlarged top view of the gear portions of the shears of FIG. 3A.
Figure 4:
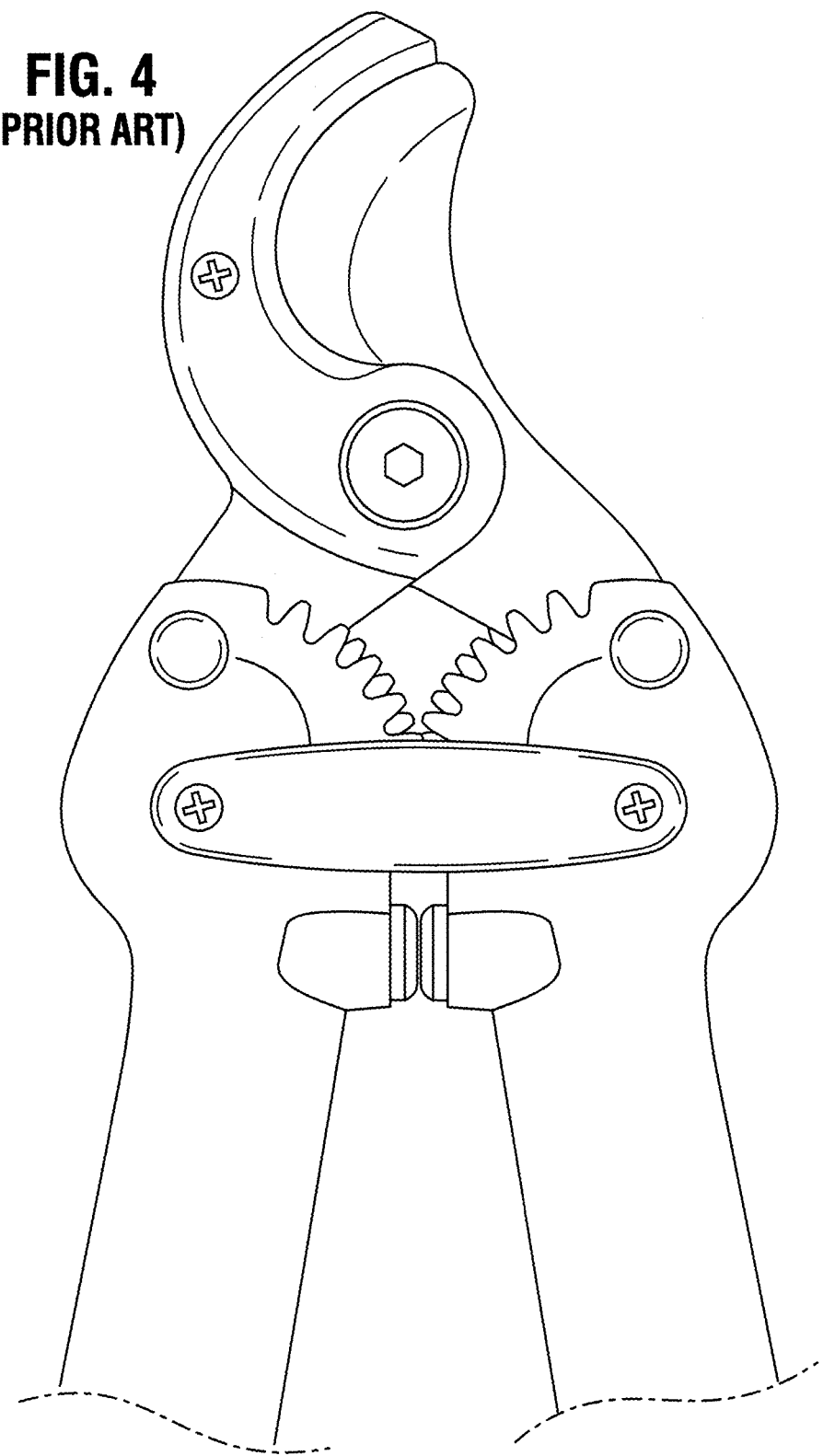
FIG. 4 is an enlarged top view of a prior art a gear tree lopper.
Figure 5:
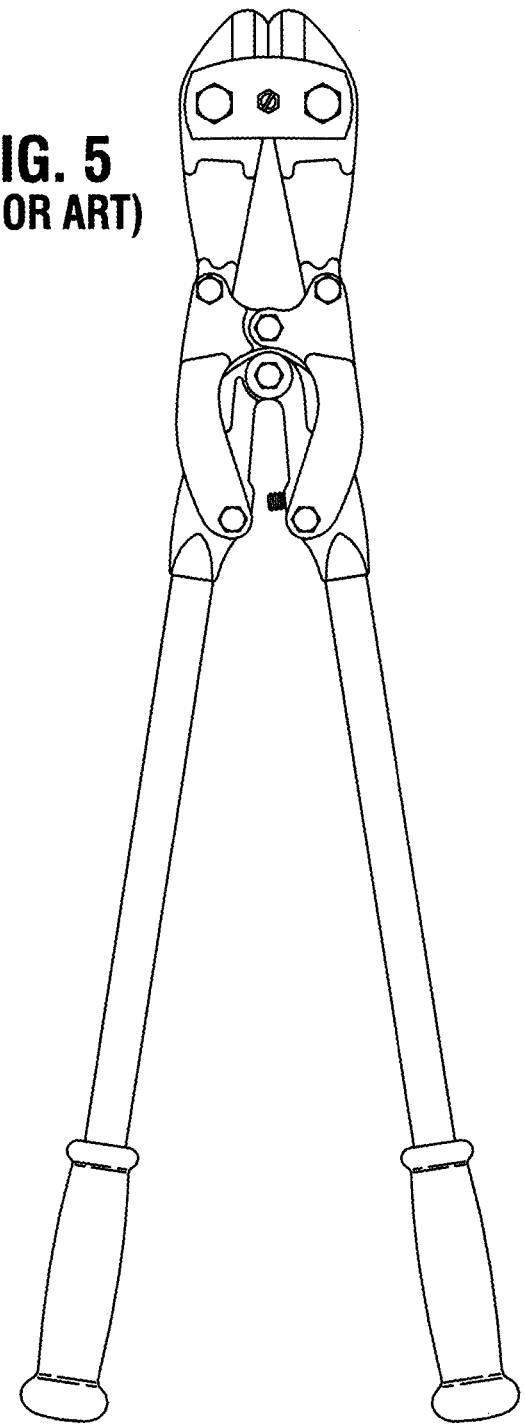
FIG. 5 is a front view of a prior art Double Compound Action Bolt Cutter by the same inventor.

The handles 218, 228 have a generally cylindrical grip with an enlarged middle section such as the prior art handles shown in FIG. 5 as compared to the handles 118, 128 in the first embodiment.

FIG. 15B is an enlarged upper front partial view of the gears and pivot locations of the novel bolt cutter 200 of FIG. 15A in a closed position. FIG. 15C is a side cross-sectional view of FIG. 15B along arrows 15C.

Other than the handles 218, 228, the second embodiment functions and operates similarly to the first embodiment bolt cutter 1.

Third Embodiment

FIG. 16A is an enlarged upper front partial view of the gears and pivot locations of a third embodiment novel bolt cutter 300 of FIG. 6 in a closed position. FIG. 16B is an upper front view of the gears and pivot locations of the novel bolt cutter 300 of FIG. 16A with arms spread out and jaws about to cut a bolt 90. The bolt cutter 300 operates similarly to the previous embodiments to cut through a bolt 90.

Bolt cutter 300 includes jaw members 10, 20, first curved bracket 50, and second curved bracket 60 that function similar to those components in the previous embodiments.

The bolt cutter 300 includes a first gear set 310 with concave teeth 318 on one end, and a pivot end 311 on an opposite end formed by a screw/bolt with mateable fastener that passes into a lower end of first curved bracket 50. The bolt cutter 300 includes a second gear set 320 with concave teeth 328 that intermeshes with concave teeth 318 of the first gear set 310. On an opposite end is a pivot end 321 formed by a screw/bolt with mateable fastener that passes into a lower end of the second curved bracket 50. A center plate 350 includes ends that pivot to first get set 310 and the second gear set 320, with respective screw/bolt and mateable fasteners.

A first curved arm 330 has a lower end that pivots by a screw/bolt and mateable fastener to an inner end of the first gear set. 310. The first curved arm 330 has an upper end that pivots by a screw/bolt and mateable fastener to an upper end of a second curved arm 230. The second curved arm has a lower end that pivots by a screw/bolt and mateable fastener to an inner end of a second gear set 320.

A second curved arm 340 has an upper end which pivots to upper end of first curved arm 330

The first gear set 310 includes a first stopper 312 and the second gear set 320 includes a second stopper 322 that limit the bolt cutter bolt cutter action to a closed position as the first arm 110 and second arm 120 are moved toward one another as shown in FIG. 16A.

Referring to FIGS. 16A-16B, as first handle 110 and second handle 120 are pulled apart, first gear set 310 with concave teeth 318 rotate clockwise while second gear set 320 with concave teeth 328 rotate counter-clockwise, and lower part of first curved arm with pivoting ends and lower part of second curved arm with pivoting ends bend toward each other. While first handle 110 and second handle 120 are pulled toward each other to cut through bolt 90, first stopper 312 abuts against second stopper 322 limit cutting edge of first jaw member 10 and cutting edge of second jaw member 20.

As discussed in the background section, U.S. Pat. No. 7,444,851 to the subject inventor covers a double compound leverage bolt cutter that delivers approximately 30% increase in leverage over the previous bolt cutter single leverage compound bolt cutter designs based on testing by APEX Tool Group in North Carolina USA.

The subject invention adding meshing gear sets to form the third compound leverage bolt, will conservatively increase leverage at least approximately 50% over the prior art single compound leverage bolt cutters.

The bolt cutter invention provides for at least approximately 50% more leverage over existing bolt cutters.

Testing of the subject invention having a triple compound leverage, has the novel bolt cutter easily cut through bolts sized up to approximately 5/16" in diameter, grade 5 and higher with ease, while holding the bolt cutter in both hands at chest level.

Testing of the invention allows the user to easily cut through bolts sized up to approximately 3/8" in diameter, grade 5 and higher with ease, while holding the bolt cutter in both hands at chest level.

Testing of the bolt cutter allows the user to have a triple compound leverage, in order to easily cut through cables, rebar, steel rods up to approximately 3/8" in diameter, grade 5 with ease, while holding the bolt cutter in both hands at chest level.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A compound leverage bolt cutter, comprising:
a first jaw member with an upper side cutting edge;
a second jaw member with an upper side cutting edge, wherein the side cutting edge of the first jaw member faces the side cutting edge of the second jaw;
a pair of plates which attach the first jaw member to the second jaw member together for allowing the upper side cutting edge of the first jaw member to pivot toward and away from the upper side cutting edge of the second jaw member;
a first bracket having an upper end pivotally attached to a base of the first jaw member, and having an inwardly side protruding tab;
a second bracket having an upper end pivotally attached to a base of the second jaw member, and having an inwardly side protruding tab, wherein the inwardly protruding tab of the first bracket is pivotally attached to the inwardly protruding tab of the second bracket;
a first gear set pivotally attached to a base of the first bracket, the first gear set including a first plate having a cam surface portion with rounded teeth, that is pivotally attached to a first elongated gear plate;
a second gear set pivotally attached to a base of the second bracket, the second gear set including a second plate having a cam surface portion with rounded teeth that mateably intermesh with the rounded teeth on the cam surface of the first gear plate, the second plate pivotally attached to a second elongated gear plate;
a first elongated arm with a first handle attached to the first elongated gear plate; and
a second elongated arm with a second handle attached to the second elongated gear plate, wherein a combination of the pivotally attached first and second brackets, with pivotal connections on the first gear set and the second gear set together create compound leverage pivoting combinations, wherein holding the first handle and the second handle at chest level increase leverage of the jaw members with respective cutting edges to cut through metal bolts, rebar, steel rods, and cables by the compound leverage pivoting combinations.

2. The compound leverage bolt cutter of claim 1, wherein the metal bolts, rebar, steel rods and cables include diameters of up to approximately 5/16" in diameter and up to a grade 5 in hardness.

3. The compound leverage bolt cutter of claim 1, wherein the metal bolts, rebar, steel rods and cables include diameters of up approximately 3/8" in diameter, and up to grade 5 in hardness.

4. The compound leverage bolt cutter of claim 1, wherein the compound bolt cutter provides at least approximately 50% more leverage over existing single leverage compound bolt cutters.

5. The compound leverage bolt cutter of claim 1, wherein the compound leverage pivoting combinations, include three compound leverage pivoting combinations.

6. The compound leverage bolt cutter of claim 5, wherein the compound leverage pivot combinations include:
a first compound leverage pivoting combination that comprises the inwardly protruding tab of the first bracket is pivotally attached to the inwardly protruding tab of the second bracket.

7. The compound leverage bolt cutter of claim 6, further includes:
a second compound leverage pivoting combination that comprises the first gear plate of the first gear set pivotally attached to the second gear plate of the second gear set.

8. The compound leverage bolt cutter of claim 7, further comprises:
a third compound leverage pivoting combination that comprises the first gear teeth of first gear plate pivotally intermeshing with the second gear teeth of the second gear plate.

9. The compound leverage bolt cutter of claim 1, further comprising:
a first button on the first handle, which when depressed allows the first arm to increase in length; and
a second button on the second handle, which when depressed allows the second arm to increase in length.

10. The compound leverage bolt cutter of claim 1, wherein the first handle and the second handle each include:
an elongated cylindrical member with an enlarged mid-section for enhancing gripping action of the first handle and the second handle.

* * * * *